(12) United States Patent
Chen et al.

(10) Patent No.: US 12,501,040 B1
(45) Date of Patent: Dec. 16, 2025

(54) NETWORK BASED IMAGE FILTERING FOR VIDEO CODING

(71) Applicant: BEIJING DAJIA INTERNET INFORMATION TECHNOLOGY CO., LTD., Beijing (CN)

(72) Inventors: Wei Chen, San Diego, CA (US); Xiaoyu Xiu, San Diego, CA (US); Yi-Wen Chen, San Diego, CA (US); Hong-Jheng Jhu, San Diego, CA (US); Che-Wei Kuo, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 225 days.

(21) Appl. No.: 18/404,816

(22) Filed: Jan. 4, 2024

Related U.S. Application Data

(63) Continuation of application No. PCT/US2022/036146, filed on Jul. 5, 2022.

(60) Provisional application No. 63/218,485, filed on Jul. 5, 2021.

(51) Int. Cl.
*H04N 19/117* (2014.01)
*G06N 3/0495* (2023.01)
*G06N 3/08* (2023.01)
*H04N 19/80* (2014.01)

(52) U.S. Cl.
CPC ......... *H04N 19/117* (2014.11); *G06N 3/0495* (2023.01); *G06N 3/08* (2013.01); *H04N 19/80* (2014.11)

(58) Field of Classification Search
CPC .................................................. H04N 19/117
USPC ...................................................... 375/240.02
See application file for complete search history.

(56) References Cited

U.S. PATENT DOCUMENTS

| | | | |
|---|---|---|---|
| 11,265,540 B2 | 3/2022 | Na et al. | |
| 2020/0126263 A1 | 4/2020 | Dinh et al. | |
| 2020/0404275 A1 | 12/2020 | Hsiang | |
| 2021/0021823 A1 | 1/2021 | Na et al. | |
| 2021/0400277 A1* | 12/2021 | Ding | ............... H04N 19/137 |

FOREIGN PATENT DOCUMENTS

| | | | |
|---|---|---|---|
| JP | 2019201255 A | 11/2019 | |
| WO | 2021091214 A1 | 5/2021 | |

OTHER PUBLICATIONS

International Search Report issue in Application No. PCT/US2022/036146 dated Oct. 17, 2022 (2p).

(Continued)

*Primary Examiner* — Amir Shahnami
(74) *Attorney, Agent, or Firm* — Arch & Lake LLP; Hao Tan; Shen Wang

(57) ABSTRACT

A method and an apparatus for image filtering in video coding using a neural network are provided. The method includes: loading, a plurality of quantization parameter (QP) map (QpMap) values at a plurality of QpMap channels into the neural network; obtaining a QP scaling factor by adjusting a plurality of input QP values related to an input frame; and adjusting, according to a QP scaling factor, the plurality of QpMap values for the neural network to learn and filter the input frame to the neural network.

20 Claims, 15 Drawing Sheets

(56) References Cited

OTHER PUBLICATIONS

Charles Bonnineau, et al., "Multitask Learning for VVC Quality Enhancement and Super-Resolution", Univ Rennes, INSA Rennes, CNRS, IETR—UMR 6164, Rennes, France, arXiv:2104.08319v1 [cs.CV] Apr. 16, 2021(5p).

Bytedance Inc., Yue Li et al., "AHG11: Conditional In-Loop Filter with Parameter Selection", Joint Video Experts Team (JVET) of ITU-T SG 16 WP 3 and ISO/IEC JTC 1/SC 29 22nd Meeting, by teleconference, Apr. 20-28, 2021, Document: JVET-V0101-v2, (6p).

Wei Chen et al., "EE-2.1.5 In-loop filtering based on neural network," Joint Video Experts Team (JVET) of ITU-T SG 16 WP 3 and ISO/IEC JTC 1/SC 29, JVET-U0101, 21st Meeting, by teleconference, Jan. 6-15, 2021, (5p).

Jianle Chen et al., "Higher granularity of quantization parameter scaling and adaptive delta QP signaling," Joint Collaborative Team on Video Coding (JCT-VC) of ITU-T SG 16 WP3 and ISO/IEC JTC1/SC29/WG11, JCTVC-F495, 6th Meeting, Torino, IT, Jul. 14-22, 2011, (6p).

\* cited by examiner

NETWORK BASED IMAGE FILTERING FOR VIDEO CODING

CROSS-REFERENCE TO RELATED APPLICATION

The present application is a continuation of PCT Application No. PCT/US2022/036146, entitled "NETWORK BASED IMAGE FILTERING FOR VIDEO CODING" filed Jul. 5, 2022, which claims priority to U.S. Provisional Application No. 63/218,485, entitled "Neural Network based Image filtering for Video Coding," filed on Jul. 5, 2021, both of which are incorporated herein by reference in their entireties for all purposes.

TECHNICAL FIELD

The present disclosure relates to video coding, and in particular but not limited to, methods and apparatus on video coding using neural network-based model filtering.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

The joint call for proposals (CfP) on video compression with capability beyond HEVC was issued by ITU-T and ISO/IEC. 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). One reference software codebase, called VVC test model (VTM), was established for demonstrating a reference implementation of the VVC standard.

SUMMARY

The present disclosure provides examples of techniques relating to improving the video coding efficiency by using neural network-based model filtering.

According to a first aspect of the present disclosure, there is provided a method for image filtering in video coding using a neural network. The method includes: loading, a plurality of quantization parameter (QP) map (QpMap) values at one or more QpMap channels into the neural network, obtaining a QP scaling factor by adjusting a plurality of input QP values related to an input frame, and adjusting, according to the QP scaling factor, the plurality of QpMap values for the neural network to learn and filter the input frame to the neural network.

According to a second aspect of the present disclosure, there is provided an apparatus for image filtering in video coding using a neural network. The apparatus includes one or more processors and a memory configured to store instructions executable by the one or more processors. Further, the one or more processors, upon execution of the instructions, are configured to perform the method according to the first aspect.

According to a third aspect of the present disclosure, there is provided a non-transitory computer-readable storage medium storing computer-executable instructions that, when executed by one or more computer processors, causing the one or more computer processors to perform the method according to the second aspect.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Figure 1:
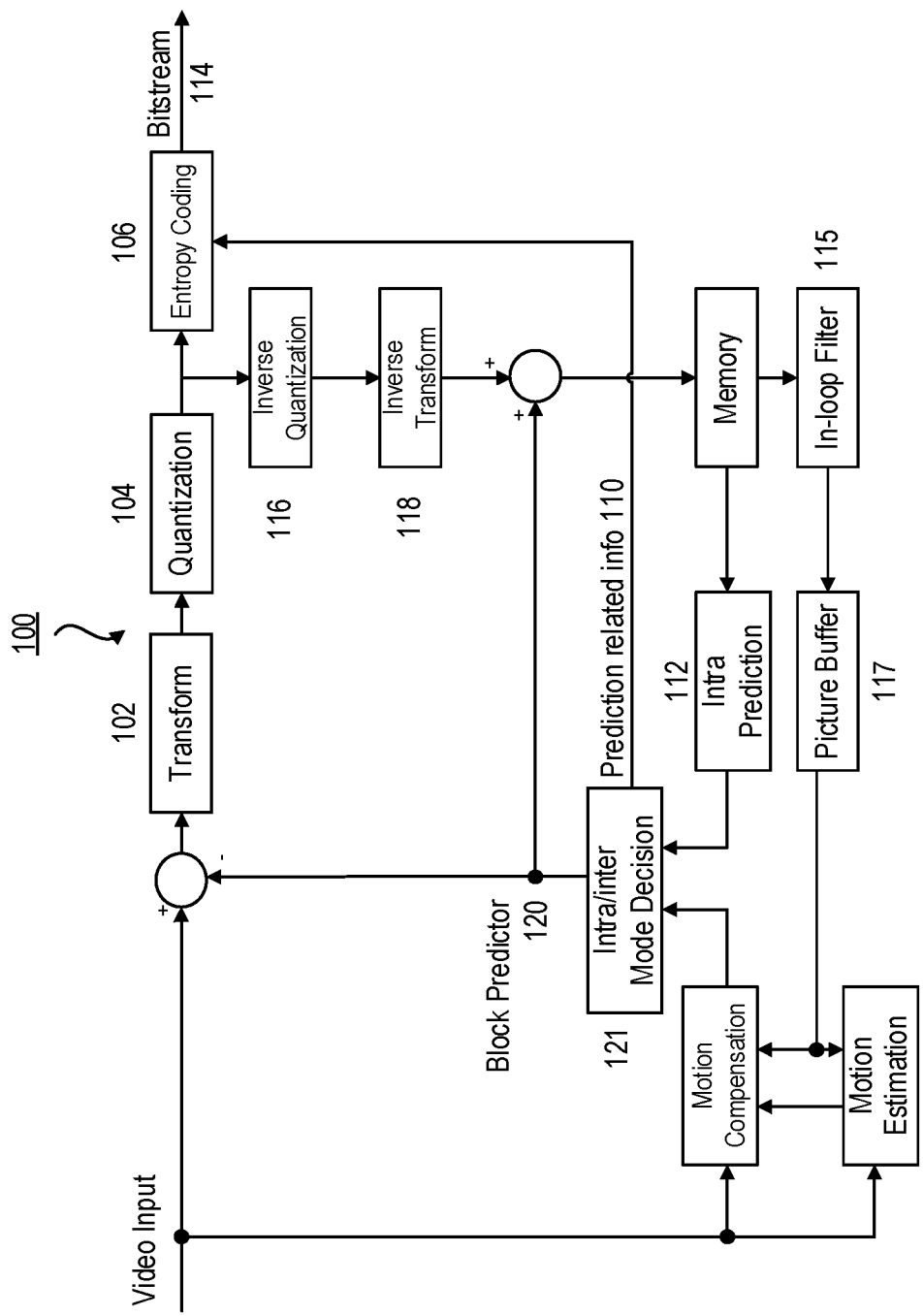
FIG. 1 is a block diagram illustrating a block-based video encoder in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 20:
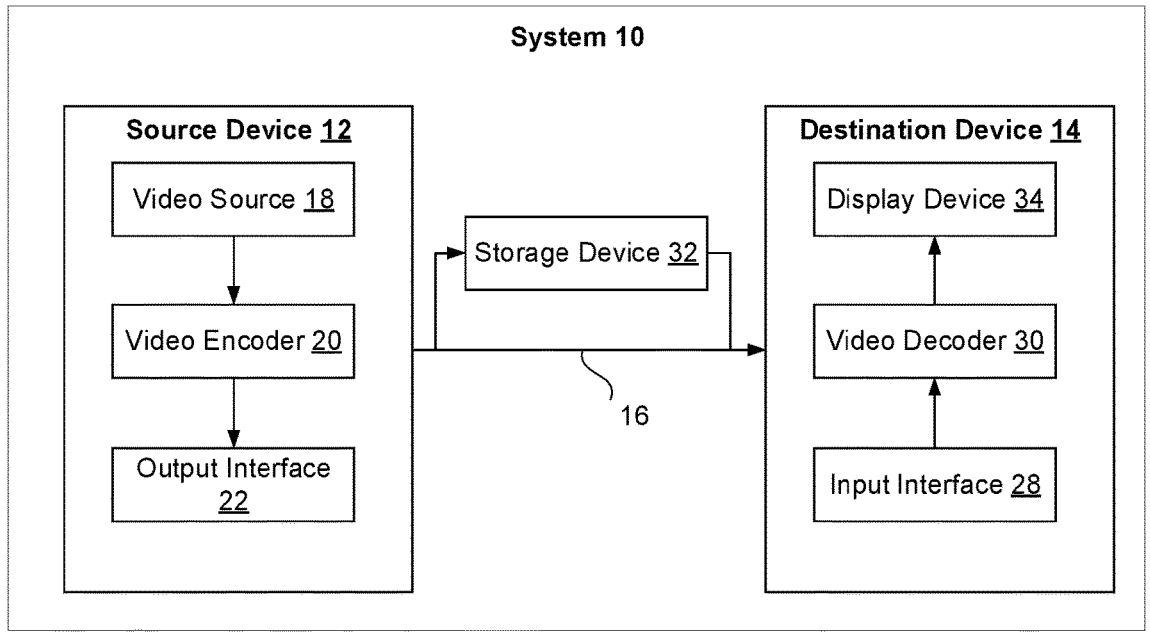
FIG. 20 is a block diagram illustrating a system for encoding and decoding video blocks in accordance with some examples of the present disclosure.

FIG. 20 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of moving the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. In one or more examples, file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 20, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Like HEVC, VVC is built upon the block-based hybrid video coding framework. FIG. 1 is a block diagram illustrating a block-based video encoder in accordance with some implementations of the present disclosure. In the encoder 100, the input video signal is processed block by block, called coding units (CUs). The encoder 100 may be the video encoder 20 as shown in FIG. 20. In VTM-1.0, a CU can be up to 128×128 pixels. However, different from the HEVC which partitions blocks only based on quad-trees, in VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

Figures 3A, 3B, 3C:
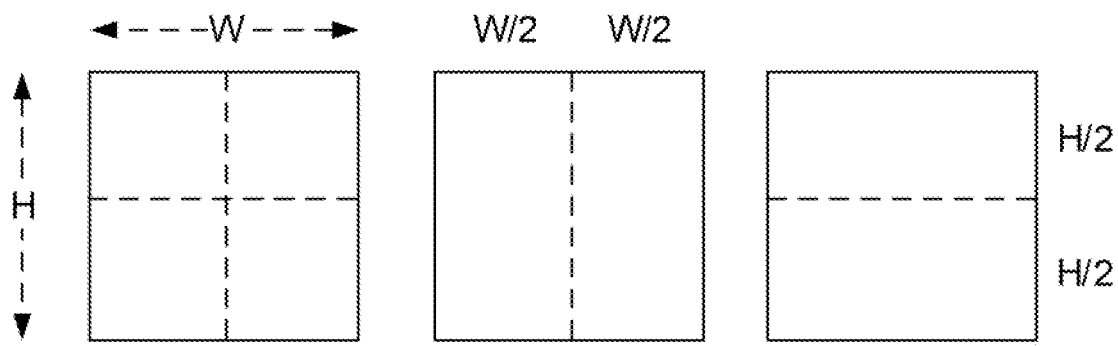
FIG. 3A is schematic diagram illustrating quaternary partitioning tree splitting mode in accordance with some implementations of the present disclosure.
FIG. 3B is schematic diagram illustrating vertical binary partitioning tree splitting mode in accordance with some implementations of the present disclosure.
FIG. 3C is schematic diagram illustrating horizontal binary partitioning tree splitting mode in accordance with some implementations of the present disclosure.
Figures 3D, 3E:
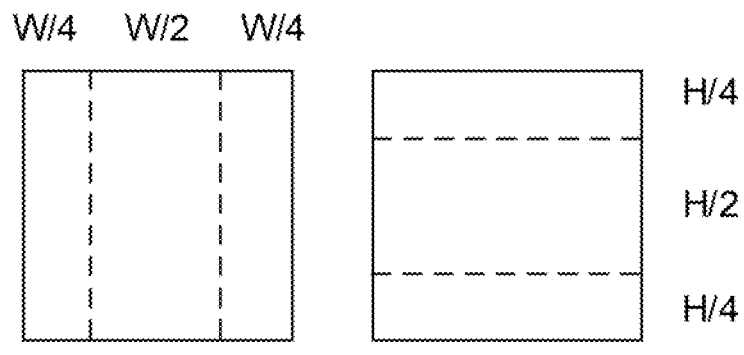
FIG. 3D is schematic diagram illustrating vertical ternary partitioning tree splitting mode in accordance with some implementations of the present disclosure.
FIG. 3E is schematic diagram illustrating horizontal ternary partitioning tree splitting mode in accordance with some implementations of the present disclosure.

FIGS. 3A-3E are schematic diagrams illustrating multi-type tree splitting modes in accordance with some implementations of the present disclosure. FIGS. 3A-3E respectively show five splitting types including quaternary partitioning (FIG. 3A), vertical binary partitioning (FIG. 3B), horizontal binary partitioning (FIG. 3C), vertical ternary partitioning (FIG. 3D), and horizontal ternary partitioning (FIG. 3E).

For each given video block, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes.

After spatial and/or temporal prediction, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO is defined to further improve coding efficiency. In the now-current version of the VVC standard, yet another in-loop filter called ALF is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
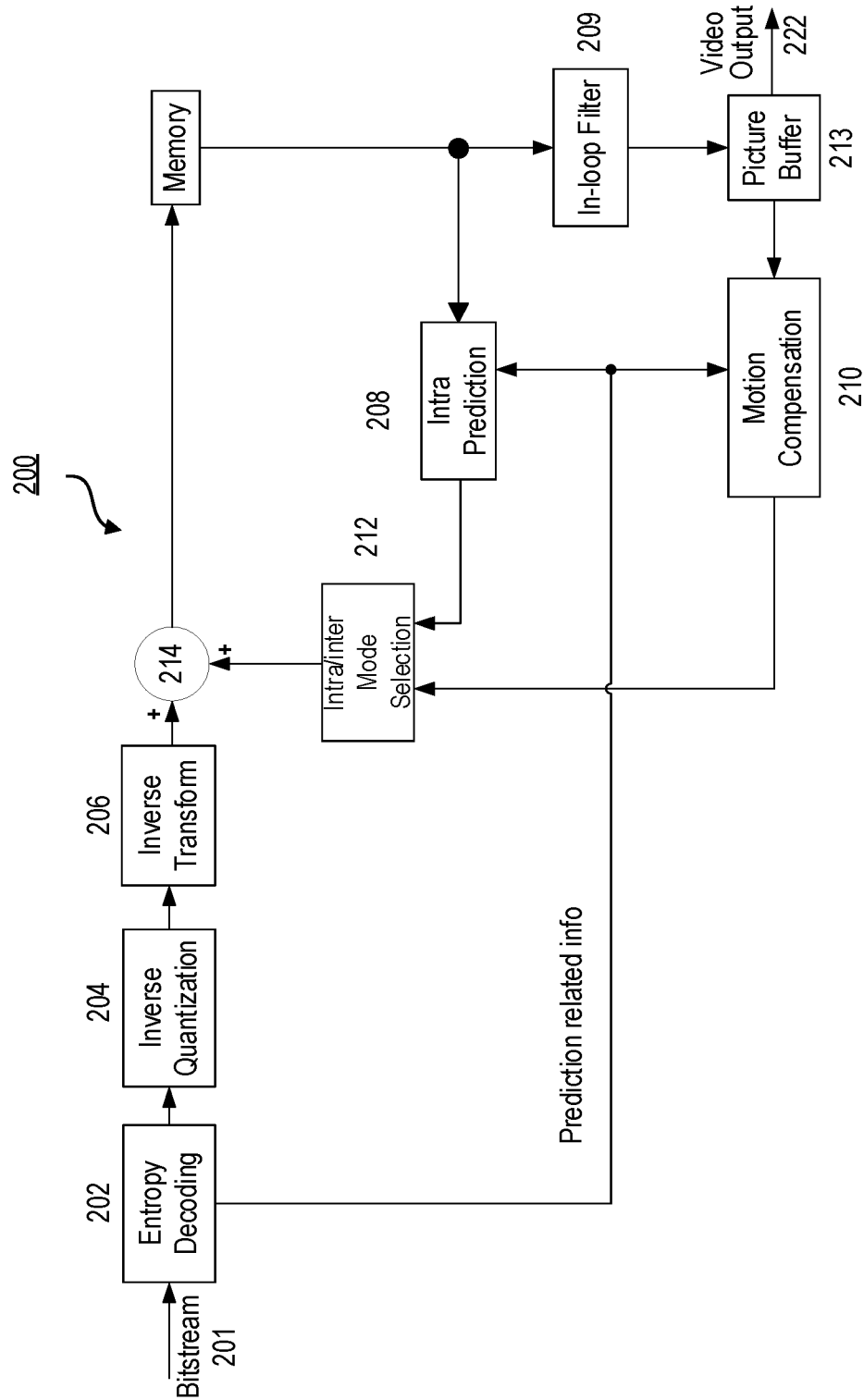
FIG. 2 is a block diagram illustrating a block-based video decoder in accordance with some implementations of the present disclosure.

FIG. 2 is a block diagram illustrating a block-based video decoder 200 which may be used in conjunction with many video coding standards. This decoder 200 is similar to the reconstruction-related section residing in the encoder 100 of FIG. 1. The block-based video decoder 200 may be the video decoder 30 as shown in FIG. 20. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

The present disclosure is to improve the image filtering design of the above-mentioned video coding standards or techniques. The filtering method provided in the present disclosure is neural network based, which may be applied as part of the in-loop filtering, e.g., between the deblocking filter and sample adaptive offset (SAO), or as part of post-loop filtering to improve the current video coding techniques, or as part of post-processing filtering after the current video coding techniques.

The neural network techniques, e.g., fully connected neural network (FC-NN), convolutional neural network (CNN), and long short-term memory network (LSTM), have already achieved significant success in many research domains, including computer vision and video understanding.

Fully-Connected Neural Network (FC-NN)

Figure 4:
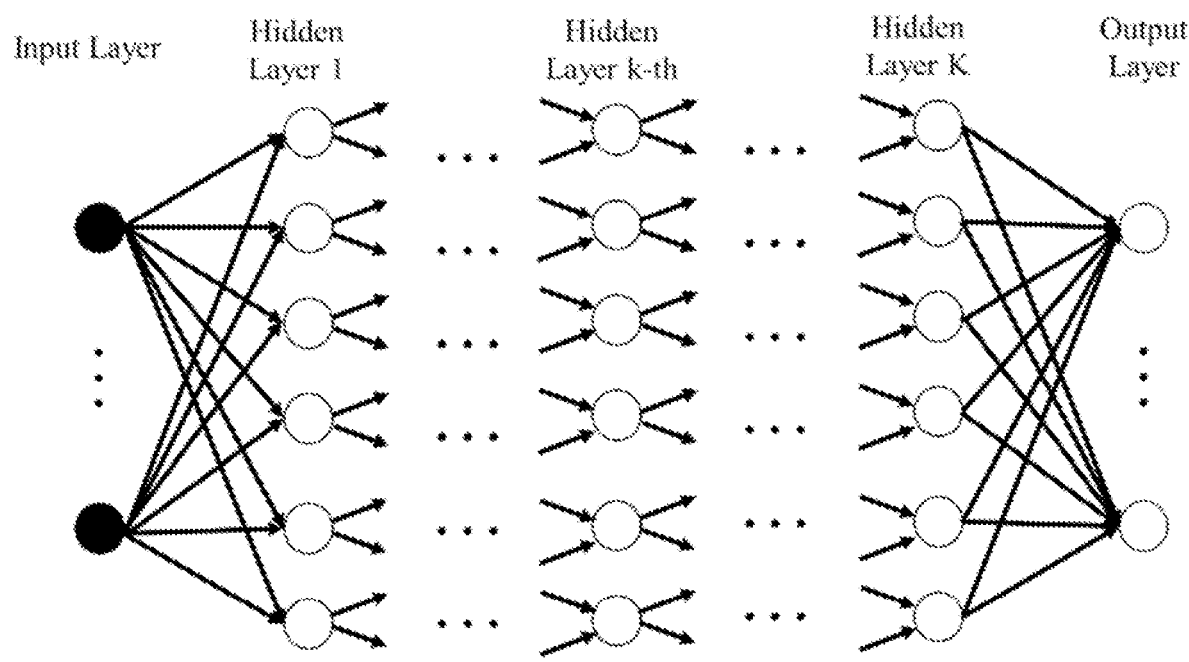
FIG. 4 illustrates a simple FC-NN consisting of input layer, output layer, and multiple hidden layers in accordance with some implementations of the present disclosure.

FIG. 4 illustrates a simple FC-NN consisting of input layer, output layer, and multiple hidden layers in accordance with some implementations of the present disclosure. At k-th layer, the output $f^k(x^{k-1}, W^k, B^k)$, is generated by $$f^k(x^{k-1}, W^k, B^k) = \delta(x^{k-1} * W^k + B^k) \quad (1)$$

$$x^{k-1} * W^k + B^k = [x_1^{k-1}, \ldots, x_j^{k-1}, \ldots, x_M^{k-1}] \cdot \begin{bmatrix} W_{1,1}^k & \cdots & W_{0,N}^k \\ \vdots & \ddots & \vdots \\ W_{M,1}^k & \cdots & W_{M,N}^k \end{bmatrix} + \quad (2)$$

$$[B_1^{k-1}, \ldots, B_j^{k-1}, \ldots, B_M^{k-1}]$$

where $x^{k-1} \in R^M$ is the output of (k−1)-th layer, $W^k \in R^{M*N}$ and $B^k \in R^N$ are the weight and the bias at k-th layer. $\delta(\cdot)$ is the activation function, e.g., the Rectified Linear Unit (ReLU) function as defined in Eq. (3).

$$\delta(x) = \begin{cases} 0, x < 0 \\ x, x \geq 0 \end{cases} \quad (3)$$

Therefore, the general form of a K-layer FC-NN is written as $$FCNN(x)=f^K(\ldots f^k(f^{k-1}(\ldots f^1(x,W^1,B^1)\ldots),W^k, B^k)\ldots,W^K,B^K), \text{ for } 1 \leq k \leq K \quad (4)$$

According to the universal approximation hypothesizes and Eq. (4), given any continuous function g(x) and some ε>0, there exists a neural network f(x) with a reasonable choice of non-linearity e.g., ReLU, such that ∀x, |g(x)−f(x)| <ε. Therefore, many empirical studies applied neural network as an approximator to mimic a model with hidden variables in order to extract explainable features under the surfaces. For example, applying in image recognition, FC-NN helps researchers to construct a system that understands not just a single pixel, but increasingly much deeper and complex sub-structures, e.g., edges, textures, geometric shapes, and objects.

Convolutional Neural Network (CNN)

Figure 5A:
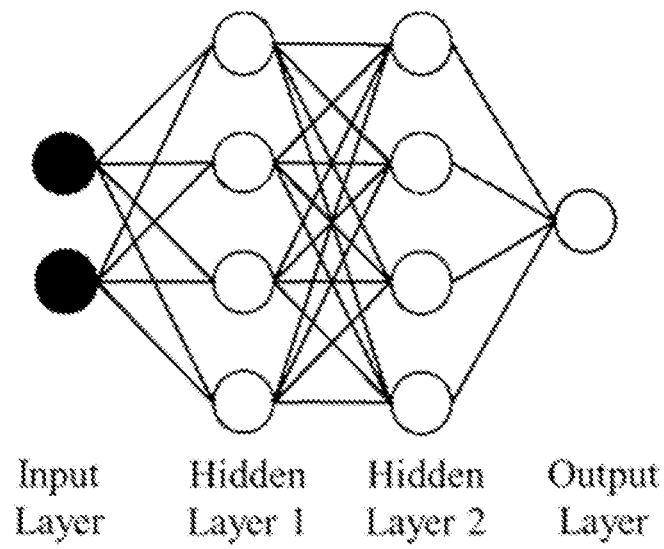
FIG. 5A illustrates an FC-NN with two hidden layers in accordance with some implementations of the present disclosure.
Figure 5B:
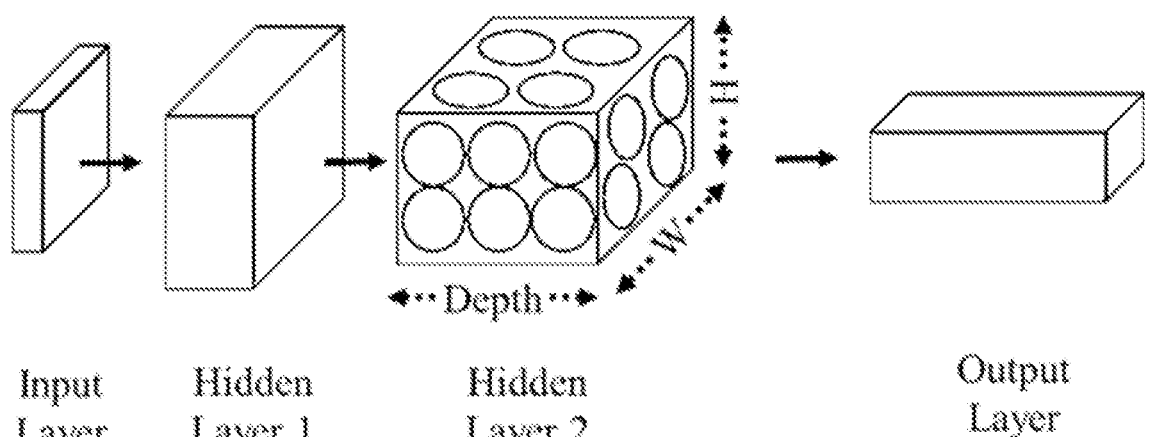
FIG. 5B illustrates an example of CNN in which the dimension of the second hidden layer is [W, H, Depth] in accordance with some implementations of the present disclosure.

FIG. 5A illustrates an FC-NN with two hidden layers in accordance with some implementations of the present disclosure. CNN, a popular neural network architecture for image or video applications, is very similar to the FC-NN as shown in FIG. 5A, which includes weights and bias metrices. A CNN can be seen as a 3-D version of neural network. FIG. 5B illustrates an example of CNN in which the dimension of the second hidden layer is [W, H, Depth] in accordance with some implementations of the present disclosure. In FIG. 5B, neurons are arranged in 3-Dimensional structure (width, height, and depth) to form a CNN, and the second hidden layer is visualized. In this example, the input layer holds input image or video frames therefore its width and height are same as input data. To apply with image or video applications, each neuron in CNN is a spatial filter element with extended depth aligned with its input, e.g., the depth is 3 if there are 3 color components in input images.

Figure 6:
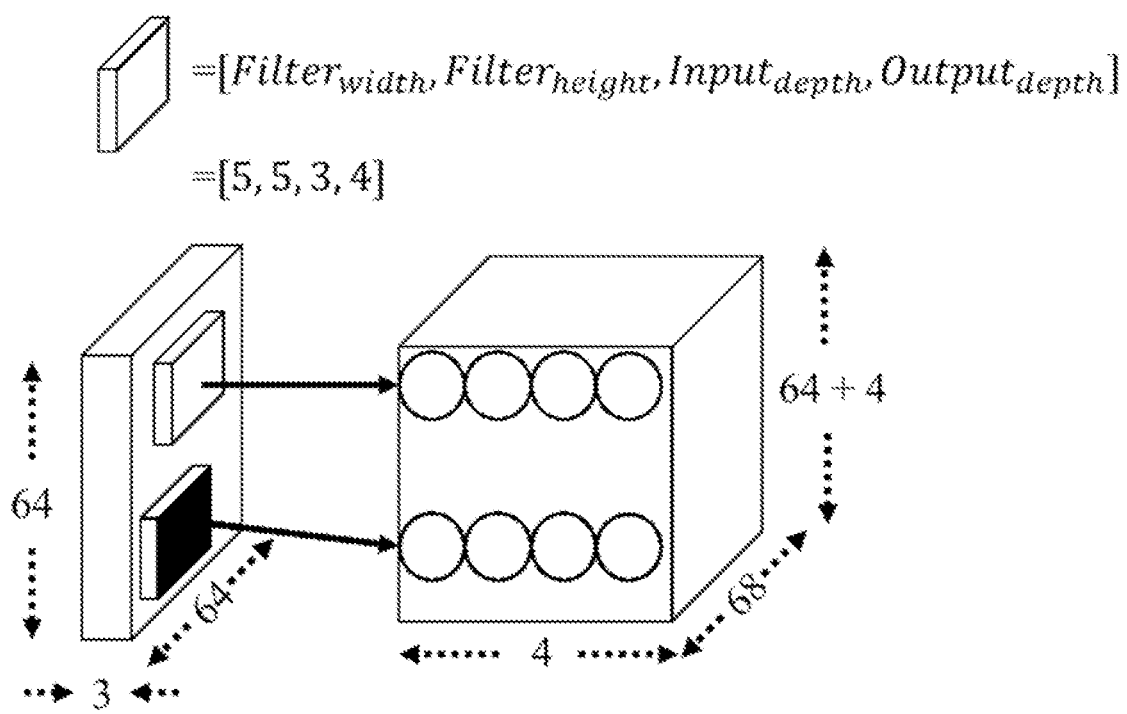
FIG. 6 illustrates an example of applying spatial filters with an input image in accordance with some implementations of the present disclosure.

FIG. 6 illustrates an example of applying spatial filters with an input image in accordance with some implementations of the present disclosure. As shown in FIG. 6, the dimension of basic element in CNN is defined as [Filter$_{width}$, Filter$_{height}$, Input$_{depth}$, Output$_{depth}$] and set to [5, 5, 3, 4] in this example. Each spatial filter performs 2-dimensional spatial convolution with 5*5*3 weights on an input image. The input image may be a 64×64×3 image. Then, 4 convolutional results are outputted. Therefore, the dimension of filtered results is [64+4, 64+4, 4] if padding the boundary with additional 2 pixels.

Residual Network (ResNet)

In image classification, the accuracy is saturated and degrades rapidly when the depth of neural network increases. To be more specifically, adding more layers on deep neural network results in higher training error because the gradient is gradually vanishing along the deep network and toward to zero gradient at the end. Then, the ResNet composed of residual blocks comes to resolve the degradation problem by introducing the identity connection.

Figure 7A:
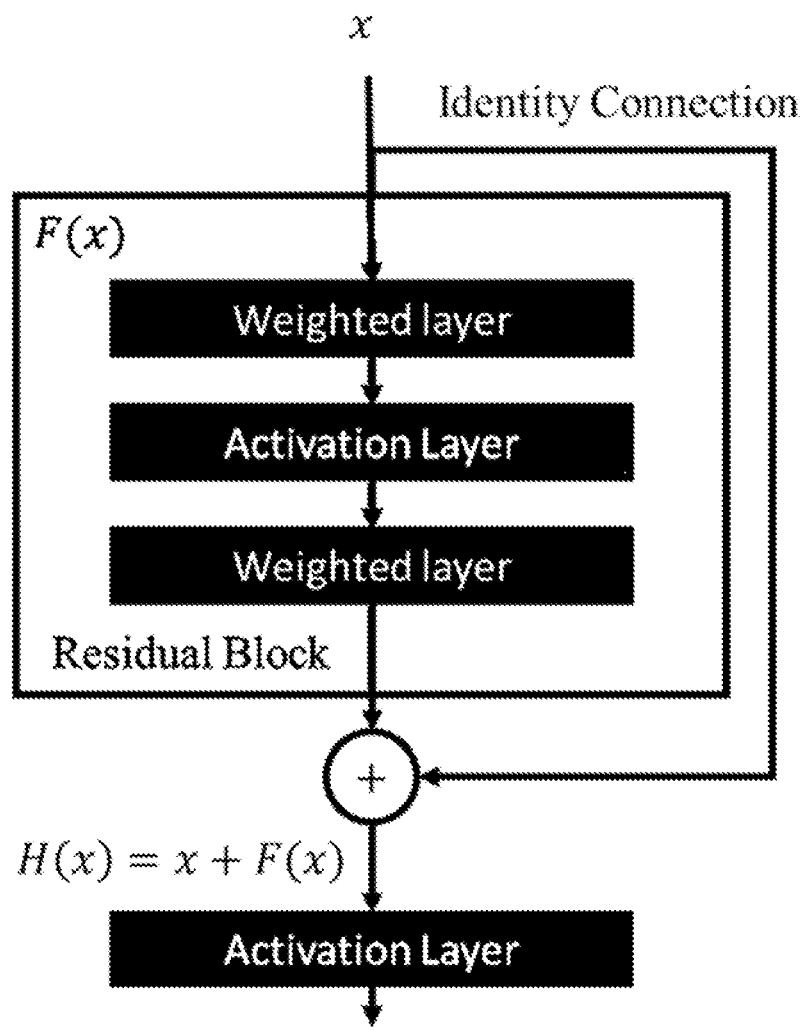
FIG. 7A illustrates a single image super-resolution (ResNet) including a residual block as the element of ResNet that is elementwise added with its input by identity connection in accordance with some implementations of the present disclosure.

FIG. 7A illustrates a ResNet including a residual block as the element of ResNet that is elementwise added with its input by identity connection in accordance with some implementations of the present disclosure. As shown in FIG. 7A, a basic module of ResNet is consist of the residual block and the identity connection. According to the universal approximation hypothesizes, given an input x, weighted layers with activation function in residual block approximate a hidden function F(x) rather than the output H(x)=F(x)+x.

By stacking non-linear multi-layer neural network, the residual block explores the features that represent the local characteristic of input images. Without introducing neither additional parameters and computational complexity, the identity connection is proven to make deep learning network trainable by skip one or more non-linear weighted layers as shown in FIG. 7A. Skipping weighted layers, the differential output of the residual layers can be written as $$\frac{\partial H(x)}{\partial x} = \frac{\partial F(x)}{\partial x} + 1 \quad (5)$$

Figure 7B:
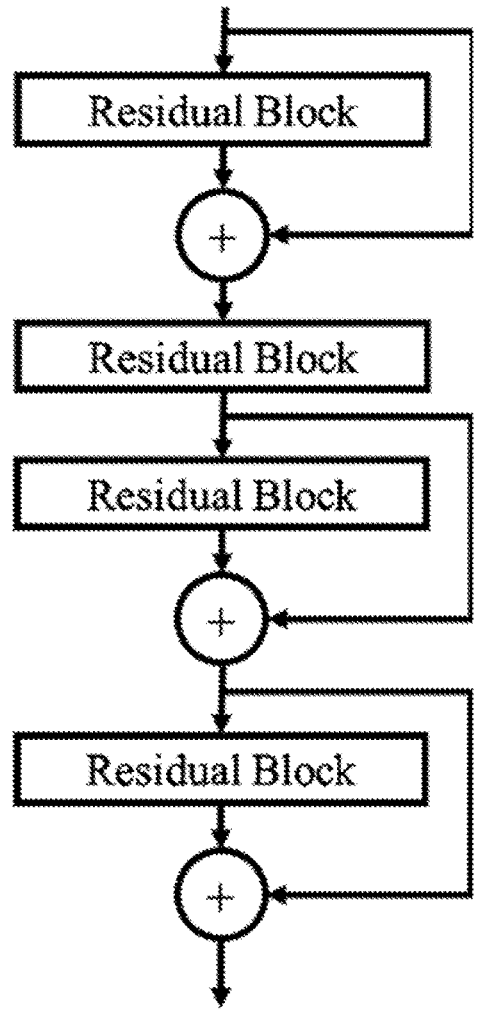
FIG. 7B illustrates an example of ResNet by staking residual modules in accordance with some implementations of the present disclosure.

Therefore, even if the differential term $$\frac{\partial F(x)}{\partial x}$$

is gradually decreasing toward zero, the identity term can still carry on and pass the input to next layer instead of stuck at zero gradient as well as blocking information propagation. If a neuron cannot propagate information to next neuron, it is seen as dead neuron, which is non-trainable element in neural network. After addition, another non-linear activation function can be applied as well. FIG. 7B illustrates an example of ResNet by staking residual modules in accordance with some implementations of the present disclosure. As shown in FIG. 7B, the residual features are fused with the identity features before propagating to the next module.

Variations of ResNet

Figure 8A:
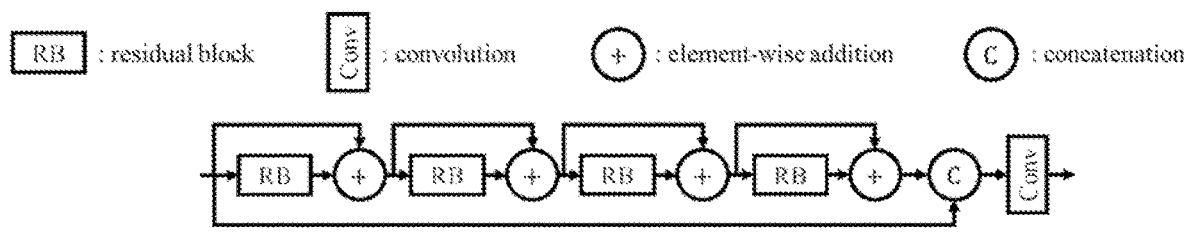
FIG. 8A illustrates an example of ResNet including a plurality of residual blocks with global identity connection in accordance with some implementations in the present disclosure.
Figure 8B:
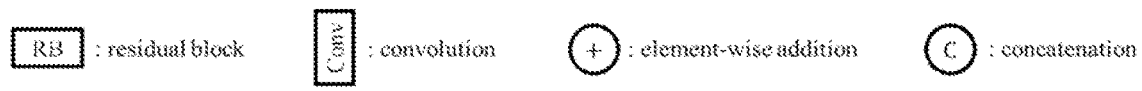
FIG. 8B illustrates another example of ResNet stacks multiple residual blocks in order to further improve the video coding efficiency in accordance with some implementations in the present disclosure.
Figure 8B:
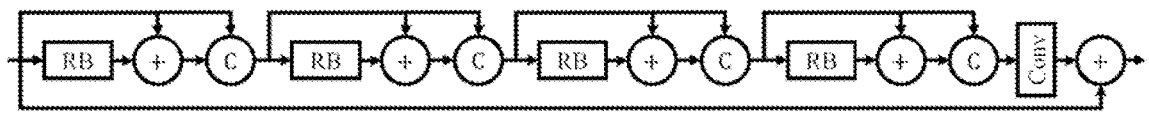

In FIGS. 8A-8B, several variations of ResNet are provided to improve the recovered image quality for single image super-resolution (SISR) and increase the accuracy for image classification. FIG. 8A illustrates an example of ResNet including a plurality of residual blocks with global identity connection in accordance with some implementations in the present disclosure. In FIG. 8A, a variation of ResNet is provided to enhance the visual quality of the up-sampled images. Specifically, a global identity connection is applied from the input of first residual block to the output of last residual block in order to facilitate the convergence of training procedure.

FIG. 8B illustrates another example of ResNet stacks multiple residual blocks in order to further improve the video coding efficiency in accordance with some implementations in the present disclosure. Each residual block directly propagates its own input to the following unit by concatenation operation. In other words, each intermediate block can receive multi-hierarchical information from its preceding units because multi-level information can flow through the identical connection. The parameter of each residual block in FIG. 8B is linearly increased with the number of layers because the concatenation operation.

In FIGS. 8A-8B, before the residual information can be propagated to later module, the residual features have to go through one or several modules. Due to identity connection, these residual features can be rapidly coupled with identity features at certain layer and stop propagating to succeeding module. Therefore, the residual features in previous two variations are limited locally and results in performance degradation.

Figure 8C:
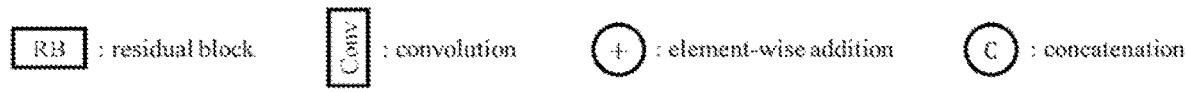
FIG. 8C illustrates another example of ResNet tackling single-image super-resolution (SISR) by aggregating the output of residual blocks in accordance with some implementations in the present disclosure.
Figure 8C:
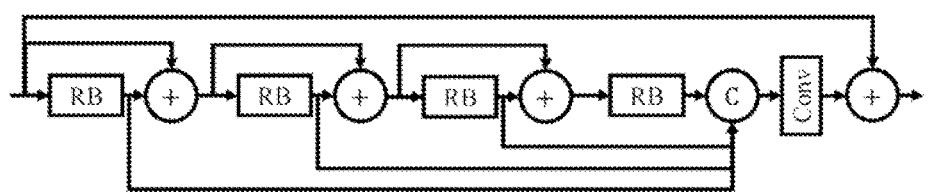

FIG. 8C illustrates another example of ResNet tackling single-image super-resolution (SISR) by aggregating the output of residual blocks in accordance with some implementations in the present disclosure. In FIG. 8C, the output of the last residual block is concatenated with all the output of previous three modules. Before applied with element-wise addition with the input of first residual block, the concatenated hierarchical features are fused by convolutional operation. Different from the first two variations, aggregated ResNet make non-local features applicable to the last residual module so that the hierarchical information can be propagated to succeeding blocks, achieving the feature representation in a more discriminative way.

In the present disclosure, methods and apparatus related to neural network based image filtering are provided to further improve the coding efficiency of current hybrid video coding. The provided methods and apparatus may be applied as part of the in-loop filtering, e.g., between the deblocking filter and sample adaptive offset (SAO) as shown in FIG. 2 or as post-loop filtering to improve the current video coding techniques, or as post-processing filtering after the current video coding techniques.

Figure 9:
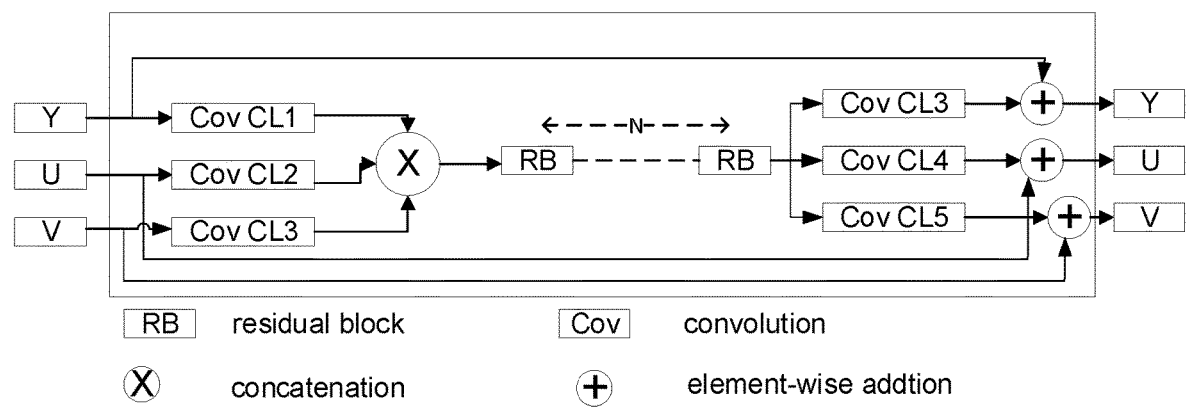
FIG. 9 illustrates a typical neural network-based model to perform image filtering for video coding in accordance with some implementations in the present disclosure.

FIG. 9 illustrates a typical neural network based model to perform image filtering for video coding in accordance with some implementations in the present disclosure. The YUV components may be provided to the neural network model in parallel. This paralleled input of YUV components may be beneficial not only for reducing processing delay but also for the neural network model to learn the correlations among collocated YUV information, e.g., cross-components filtering and/or luma guided chroma filtering. The on/off control of this neural network model-based filter may be performed at coding tree unit (CTU) level for reasonable trade-off between control granularity and signaling overhead. The on/off control of the neural network-based filters for YUV components may be performed at same or different granularity. For example, the on/off control of this neural network model-based filter for Y component may be performed at CTU level while the on/off control for U and V components may be performed at frame level, e.g., to save CTU level flag signaling overhead.

Feature Map Resolution Alignment

When the CTU level YUV information is provided to the neural network model filter as shown in FIG. 9, the resolutions of the YUV CTU patches may or may not be the same. For example, if the encoded video content is YUV420, the resolutions of the three collocated YUV patches may not be the same. In this case, resolution alignment is needed. For easier illustration purpose, all the methods and devices provided in this disclosure are assuming the video content is YUV420. For different content format, e.g., YUV422, YUV444, the provided methods may be easily extended.

In some examples, the resolution alignment may be performed before the YUV patches enter the neural network.

In some examples, one 128×128 Y patch may be down-sampled into one 64×64 patch or four 64×64 patches. When four 64×64 patches are generated, all the information of the original 128×128 patch may be kept and distributed in the four patches. The method used for the information distribution of the original 128×128 patch may be partition based, e.g., one 64×64 patch may be from the top-left of the original 128×128 patch, and another 64×64 patch may be from the top-right of the original 128×128 patch. Alternatively, the method used for the information distribution of the original 128×128 patch may be interleave based, e.g., every four adjacent samples of the original 128×128 patch are evenly distributed in the four 64×64 patches.

In some examples, one 64×64 U or V patch may be up-sampled into one 128×128 patch.

In some examples, the resolution alignment may be performed after the YUV patches enter the neural network. In one example, the Y input resolution may be decreased to match the UV input. One way to achieve this is to use convolution layers with doubled stride size compared to UV input. In this example, at the end of the neural network, a resolution increase layer is needed to scale up the Y content such that the output of the model has the same resolution as the input. One way to achieve this is to use pixel shuffle layer to scale up the Y resolution. In another example, the UV input resolution may be increased to match the Y input. One way to achieve is to use pixel shuffle layer to scale up UV at the beginning of the neural network, and then scale down at the end of the neural network.

Feature Map Resolution Control

Feature map resolution proportionally affects the neural network processing overhead, but may not be proportionally affect the performance of the neural network. In order to control the computation complexity of the model filtering, different solutions may be available, e.g., number of residual blocks, number of input and output channels of the convolution layers at each residual block. Resolution control of the feature map in a convolution layer is another effective option to control the computation complexity.

Figure 10:
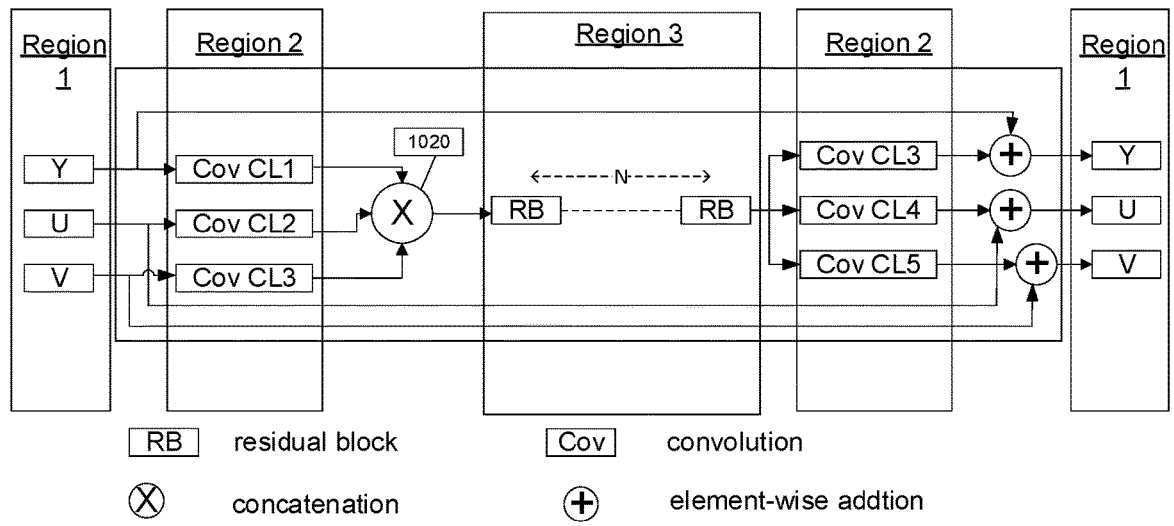
FIG. 10 illustrates region-based feature map resolution control in accordance with some implementations in the present disclosure.

FIG. 10 illustrates region-based feature map resolution control in accordance with some implementations in the present disclosure. As shown in FIG. 10, three regions may be used to adjust feature map resolution for computation complexity control (which can be termed as region-based feature map resolution control). In the region 1, resolution of the input YUV patches are determined and corresponding scale up/down operations are performed. For example, the up/down sampling methods introduced in "Feature map resolution alignment." An example is shown in FIG. 15.

Figure 15:
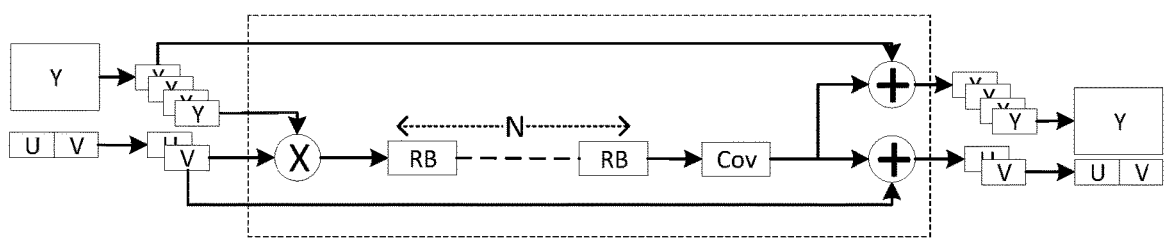
FIG. 15 illustrates Luma down-sampling in region 1 of a neural network in accordance with some implementations of the present disclosure.

FIG. 15 illustrates Luma down-sampling in region 1 of a neural network in accordance with some implementations of the present disclosure. As shown in FIG. 15, the original Y patch is down-sampled into four down-sampled Y patches in region 1 before entering the neural network. For example, one 128×128 Y patch may be down-sampled into four 64×64 Y patches. The inverse operation, e.g., up-sample, is performed in region 1 after the processing of the neural network finishes. As shown in FIG. 15, the four down-sampled Y patches outputted by the neural network are up-sampled into one original Y patch. For example, the four 64×64 Y patches may be up-sampled into one 128×128 Y patch.

In region 2, resolution of the input YUV patches are determined and corresponding scale up/down operations are performed before YUV concatenation. As this region is located at the beginning of the neural network, if scale down operations are performed, input information may be lost significantly and overall performance after model training may be compromised. Two examples are respectively shown in FIGS. 13-14.

Figure 13:
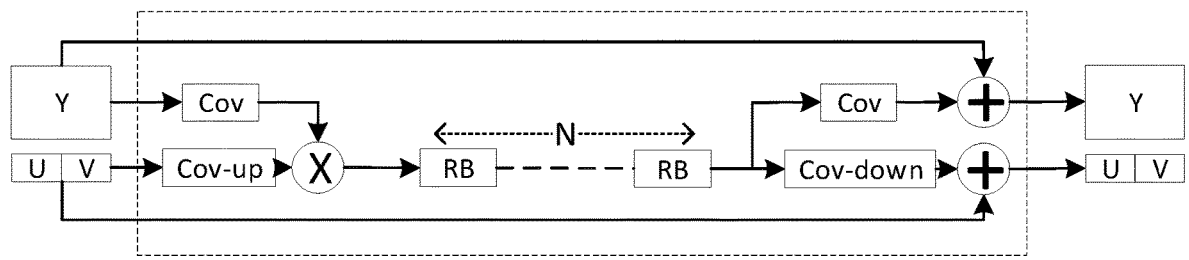
FIG. 13 illustrates Chroma up-sampling in region 2 of a neural network in accordance with some implementations of the present disclosure.

FIG. 13 illustrates Chroma up-sampling in region 2 of a neural network in accordance with some implementations of the present disclosure. As shown in FIG. 13, the UV patches, after entering the neural network, are scaled up by a corresponding convolution block or layer in region 2 of the neural network. An inverse operation, e.g., scaling-down, is performed on the corresponding UV patches outputted by the last residual block in region 3, as shown in FIG. 13.

Figure 14:
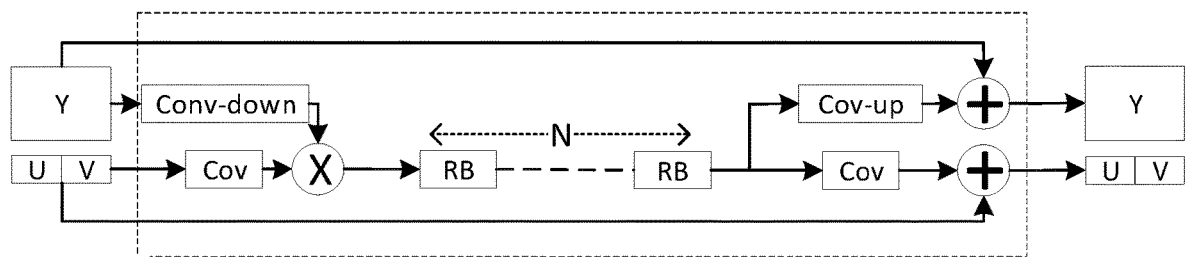
FIG. 14 illustrates Luma down-sampling in region 2 of a neural network in accordance with some implementations of the present disclosure.

FIG. 14 illustrates Luma down-sampling in region 2 of a neural network in accordance with some implementations of the present disclosure. As shown in FIG. 14, the Y patch, after entering the neural network, is scaled down by a corresponding convolution block or layer in region 2 of the neural network. An inverse operation, e.g., scaling-up, is performed on the corresponding Y patch outputted by the last residual block in region 3, as shown in FIG. 14.

In the region 3, resolution of the input YUV patches may be scaled up/down at one of the earlier residual blocks, and inverse operations, e.g., scale down/up, may be performed at later residual blocks. As this region is located after YUV concatenation, if scale down operation is performed, input information may be less significantly lost than region 2 since most input information are already captured or learned in earlier convolution layers which have enough depth for information learning. For example, after region 2, three channels of YUV content which has UV scaled up to 128×128 are generated. Y input information may be already learned/extracted and distributed/duplicated in earlier convolutional layers before the concatenation. Alternatively, a scale down operation may be performed after the first residual block because the first residual block may have enough channels to learn/extract Y input information features.

QP Independent Neural Network Model

In order to facilitate easier deployment of the provided neural network model filtering, it is desired to remove input quantization parameter (QP) dependency from the neural network model. Thus, a single neural network model may be used for image filtering regardless of the input QP used for the video coding.

Figure 11:
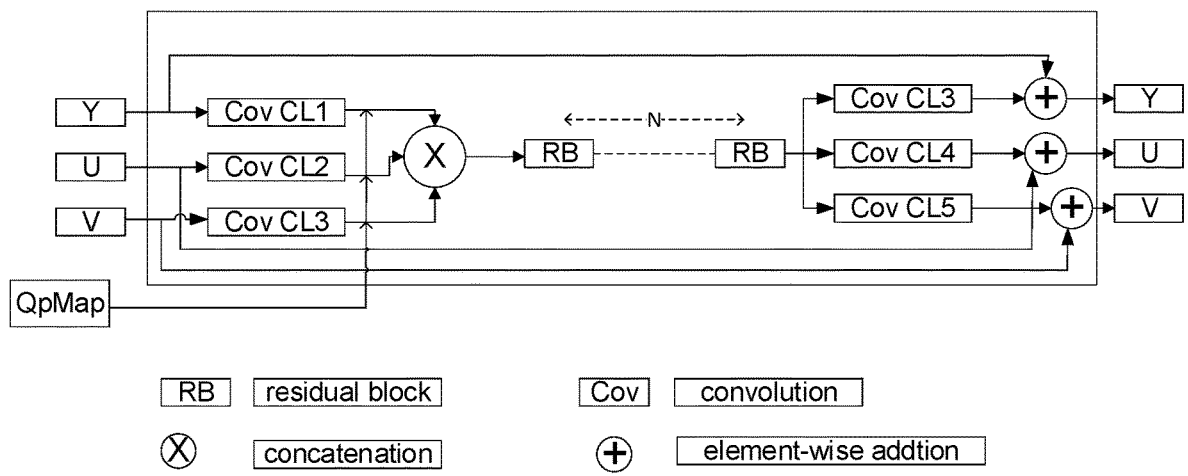
FIG. 11 illustrates a typical QP-independent neural network model in accordance with some implementations of the present disclosure.

FIG. 11 illustrates a typical QP-independent neural network model in accordance with some implementations of the present disclosure. For a typical video coding system, a QP value is used to calculate quantization step size for prediction residual quantization/de-quantization. Therefore, a different QP value represents a different level of video quality. In order to handle different video frames with different input QP and quality, a QpMap is provided to the neural network. The QpMap adds another dimension of information for neural network to learn and adaptively filter the provided YUV input which may include different levels of video quality (e.g., input Qp). In some common video coding standards such as HEVC, VVC or AVS, a predefined relationship (e.g., $Q_{step}=2^{(QP-4)/6}$) is typically used when an input Qp value is converted into a Qp step size for prediction residual quantization. For easier illustration, a QpMap containing or including either input Qp values or Qp step size values is used to introduce the ideas provided as below.

Dynamic Range Control of QpMap Values

FIG. 11 illustrates a typical QP-independent neural network based model to perform image filtering for video coding in accordance with some implementations of the present disclosure. The QpMap are concatenated with YUV input channels. Each QpMap channel may contain the same value at different coordinates. And each QpMap channel may have the same resolution as the associated input channel. This is to say, QpMap channel for Y input has the same resolution as the Y input channel and each value of the QpMap indicates that all the samples within the Y input channel has the same Qp values.

Input QP value of each video frame/image may be directly used to generate QpMap value. Alternatively, input QP value of each video frame/image may be converted into Qp step size first, e.g., $Q_{step}=2^{(QP-4)/6}$, to generate QpMap value. In some examples of the present disclosure, Qp step size $Q_{step}$ may sometimes be referred as $QP_{step}$.

When QpMap values are generated from input QP or Qp step size, the QpMap value dynamic range is desired to be reasonable in following three senses.

First, the range should be large enough, so that different QpMap value can be easily used to represent/differentiate different input Qp or Qp step size. In other words, given two input Qp value, the corresponding QpMap values should not be close to each other.

Second, the range should be balanced enough, so that different QpMap value can evenly distributed at different positions of the range.

Third, the range should match the dynamic range of the associated YUV sample values. For example, if YUV sample values are normalized to [0, 1] by dividing the $P_{max}$, where $P_{max}=2^{bitdepth}-1$, the QpMap value is supposed to be normalized in a similar range as well.

Therefore, when QpMap is mapped to a dynamic range, it is provided in the present disclosure to not use the maximum or minimum input Qp or Qp step size as the dividing factor, otherwise the division will push the generated QpMap value towards one side of the dynamic range, which is equal to reduce the dynamic range of the QpMap value.

For example, if using maximal QpStep size 912 (corresponding to maximal input Qp 63), the theoretic dynamic range is (0, 1), but if input Qp step size is typically less than 45 (corresponding to input Qp 37), the effective dynamic range is only (0, 0.05), which means that in most cases QpMap value is close to 0.

Instead, it is provided to use middle/median input Qp or Qp step size to do the normalization, so that the generated QpMap value may be distributed at either side of the dynamic range. e.g. [0.5, 1.5]. In one example, selected middle/median input Qp value is Qp 32, and then converted into Qp step size is approximately 25.5, according to a QP-to-Qstep (Qp step size) equation (e.g., $Q_{step}=2^{(QP-4)/6}$). Thus, any input Qp value is first converted to a corresponding Qp step size and then followed by a division by the selected Qp Step size 25.5.

This selected input Qp or Qp step size for normalization division may be flexibly determined based on the actual input Qp range. For example, given an actual Qp range [22, 42], Qp 37 or its corresponding Qp step size may be selected as the dividing factor such that the normalized value of lower Qps in the actual Qp range are not too close to zero while the normalized value of higher Qps are not too much over 1.0. Alternatively, the maximum value of the actual input QP range (e.g., 42 of the actual Qp range [22, 42]) or its corresponding Qp step size may be selected as the dividing factor if the maximum value is not too big (e.g., within twice size) than the minimum value.

Prediction Based Adjustment of QpMap Values

As explained above, the QpMap values may be directly generated by the input Qp value, or may be generated by the Qp step size value according to the mapping relationship between input Qp value and Qp step size. For easier illustration purpose, the below description assumes that the QpMap values are directly generated by the input Qp value. When the QpMap values are generated by Qp step size values, the provided ideas/methods may be similarly extended.

For inter-predicted video frames/images, most blocks/CTUs in the frame/image may be inter-predicted with small or no residuals, e.g., skip mode. In this case, the effective input Qp value should be determined by the corresponding reference frames/images.

In some examples, the input Qp value of the corresponding reference frame/image may be saved and obtained when the current image is reconstructed during motion compensation process. The input QP value of each current frame is known. But the input Qp value of this frame becomes unknown when this frame is not current and this frame is a reference frame for another frame. Thus, Qp values have to be saved in order to obtain it in the future.

In some examples, the input Qp value of the corresponding reference frame/image may be derived by subtracting a specific value from the QP value of the current frame which is inter-coded, where the specific value may be obtained by checking the temporal layer index of the current frame which is inter-coded.

In some other examples, if the reference frame/image is a chain of reference images (the reference frame/image of a reference frame/image), this information may be inherited or carried over from signaling.

In a simple solution, for an inter-predicted video frame/image, the effective Qp step size may be derived by a constant scaling factor such as 0.5 from the Qp step size of the current frame, which corresponds to an input Qp difference with value 6. This scaling operation is an approximation to the reference frame/image input Qp or Qp step size.

Due to the typical mapping relationship between Qp Step size and input Qp (e.g., $Q_{step}=2^{(QP-4)/6}$), the scaling operation of Qp step size is equivalent to the subtraction/addition operation of the input Qp value. That is, the scaling operation of Qp step size can be implemented by applying a subtraction/addition operation of the input Qp value.

Depends on the trade-off between signaling overhead and prediction-based adjustment accuracy, the scaling of Qp step size or the subtraction/addition of the input Qp value may be represented in a different precision or/and at different granularity. For easier illustration, the ideas/methods provided below assume that the scaling of QpStep size is used for prediction-based adjustment of QpMap values. When the subtraction/addition of the input Qp value is used for prediction-based adjustment of QpMap values, the provided ideas/methods may be extended straightforwardly.

In one or more examples, the scaling of Qp Step size may be applied to an intra-predicted frame/image as well, to compensate the inaccuracy of the constant scaling factor used for subsequent inter-predicted frames.

In another example, the Qp scaling factor may be flexibly derived using following different methods.

In the first method, the Qp scaling factor may be selected by the encoder from a set of values. The scaling factor set may be sequence based or image/slice based, which means the set may be coded in the picture header or sequence parameter set. The index of the selected Qp scaling factor in the scaling factor set may be selected based on rate-distortion optimization algorithms at the encoder side with different granularities, e.g., picture level index selection, CTU level index selection, block level selection (e.g., a picture may be portioned into different blocks based on quad-tree division), for the purpose of good trade-off between image quality and signaling overhead.

In the second method, the Qp scaling factor may be converted to a Qp offset/adjustment. The Qp offset/adjustment may be applied to the input Qp or Qp step size before calculating the QpMap values.

In one example, an adjusted input Qp value may be represented as $$Q_{p\_new}=Q_{p\_old}-Q_{p\_offset\_stepsize} \times (\text{lower\_bound}-\text{offset\_index})$$

where $Q_{p\_old}$ is the original Qp value for the current slice or CTU, $Q_{p\_new}$ is the new Qp value after adjustment, $Q_{p\_offset\_stepsize}$ is the step size for each Qp adjustment, lower_bound is an integer value which determines the maximum Qp reduction, and offset_index is a signaled index value (e.g., a value in range [0, 3]). The offset_index is decided at the encoder side and parsed/used at the decoder side. Note that Qp_offset_stepsize and lower_bound predefined constant value, or signaled as well.

For example, Qp_offset_stepsize may be a constant value such as 4, lower_bound is 2, when signaled offset_index is 1, the decoder may adjust the current Qp value 32 to be 28, where 28=32−4*(2−1).

In the third method, for current CTU/picture/block, the Qp scaling factor may be inherited from adjacent CTUs/picture/blocks (e.g., left or above CTUs/blocks in spatial domain, or the reference blocks/CTUs in time domain) to save signaling overhead.

In the fourth method, instead of signaling or inheritance, the Qp scaling factor may be calculated at the decoder side by the Qp difference of the current CTU/block and reference CTU/block. If there are multiple reference CTUs/blocks corresponding to the current CTU/block, an averaged value of the Qp scaling factor may be calculated. If a reference CTU/block is involved in a reference chain. The reference depth may be constrained and the Qp scaling factor may be calculated according to the parent reference CTU/block at most of the constrained reference depth.

In the fifth method, the Qp scaling factor of different components may be jointly signaled/selected/calculated for lower complexity. Alternatively, the Qp scaling factor of different components may be separately signaled/selected/calculated. Alternatively, the Qp scaling factor of luma and chroma may be separately signaled/selected/calculated.

In the sixth method, any combination of the above methods may be used as a hybrid method.

Furthermore, in the second method above, one embodiment of the derivation process can be introduced as below:

In general, the QpMap value ($QM_{CH}(x, y)$) at the position (x, y) for channel CH may be calculated as:

$$QM_{CH}(x, y) = QP^{norm}_{step}(x, y) \cdot \alpha_{CH} \qquad (6)$$

where, $\alpha_{CH}$ is the signaled QP scaling factor for channel CH, $$QP^{norm}_{step}(x, y)$$

is the normalized QP step value at the position (x, y), which can be calculated as:

$$QP^{norm}_{step}(x, y) = QP_{step}(x, y)/QP^{max}_{step} \qquad (7)$$

In VVC, the relationship between QP and the quantization step Qstep is given by $QP_{step}=2^{(QP-4)/6}$. Thus equation (7) can be rewritten as $$QP^{norm}_{step}(x, y) = 2^{(QP-QP_{max})/6} \qquad (8)$$

In one embodiment, for equation (8), QP is the input QP of the current frame, which is channel dependent. $QP_{max}$ is the maximum allowed input QP which is equal to 63 in the VVC. With equations (7) and (8), equation (6) can be rewritten as $$QM_{CH}(x,y)=2^{(QP_{CH}-QP_{max})/6} \cdot \alpha_{CH} \qquad (9)$$

From equation (9), it can be observed that all the terms are either channel dependent or a constant value. Therefore, for each channel of the quality map, values at different positions are the same.

For easier implementation, two modifications can be further made to the equation (9). The first modification is to use a constant value $QP_{selected}$ as $QP_{max}$, instead of the actual value 63 in VVC. The motivation is to avoid the gradient vanishing problem caused by a very small quality map value. Note that $QP_{selected}$ is equivalent to control the dynamic range of the QpMap values, which are already introduced in section "Dynamic range control of QpMap values." The second modification is to signal a QP offset value instead of the scaling factor $\alpha_{CH}$. In this case, equation (9) can be rewritten as $$QM_{CH}(x,y)=2^{(QP_{CH}-QP_{offset}-QP_{max})/6}=2^{(QP_{CH}-QP_{max})/6} \cdot 2^{(-QP_{offset})/6} \qquad (10)$$

Compared equation (10) with equation (9), it is equivalent to represent $\alpha_{CH}$ with a closed form expression of the newly signaled QP offset value $QP_{offset}$. In one embodiment, $QP_{offset}$ needs to be determined per input video block, because the corresponding reference block comes from an independently selected temporal reference picture. In another embodiment, $QP_{offset}$ is determined and signaled at frame level to save signaling bits, which means all CTUs within the same video frame share the same value of $QP_{offset}$.

In one example, $QP_{offset}$ is implemented as a look up table (LUT). As shown in Table 1, instead of directly signaling a QP offset value, a predefined code word may be defined. Based on the received code word in the bitstream, the actual QP offset value used for equation (10) can be retrieved from the LUT shown in Table 1. For example, if a coded word "01" is received at the decoder side, in the example shown in Table 1, an QP offset value 8 can be derived. Note that in Table 1, the mapped QP offset has a constant step size at 4, another example LUT with step size at 5 may be defined in Table 2.

TABLE 1

An exemplary LUT used for signaling a scaling factor

| Signaled code word | Corresponding QP offset |
| --- | --- |
| 00 | 12 |
| 01 | 8 |
| 10 | 4 |
| 11 | 0 |

TABLE 2

Another exemplary LUT used for signaling a scaling factor

| Signaled code word | Corresponding QP offset |
| --- | --- |
| 00 | 15 |
| 01 | 10 |

TABLE 2-continued

Another exemplary LUT used for signaling a scaling factor

| Signaled code word | Corresponding QP offset |
| --- | --- |
| 10 | 5 |
| 11 | 0 |

The LUT based implementation of $QP_{offset}$ may be defined at different granularities, e.g., sequence level, frame level, etc. For different LUTs, the LUT difference may be signaled or the LUT step size difference may be signaled. For example, the step size difference of the LUT in Table 1 and Table 2 is equal to 1 (5−4=1).

QpMap Value Based Sample Value Scaling

A QP-independent neural network model may not explicitly contain QpMap channels in the network. For example, as shown in FIG. 11, the QpMap value generated for each YUV channel is concatenated with YUV channels. Alternatively, the QpMap value fed into the network may be used to directly scale the sample values in each YUV channel. In this way, QpMap channels are not concatenated with YUV channels, which represents an implicit use of QpMap in the network.

When QpMap channels are input to the network and concatenated with YUV channels, similar as shown in FIG. 11, sample value scaling, i.e., scaling of the sample values at YUV channels, may be directly performed by element-wise multiplication. For example, each element of the QpMap channel for Y component is multiplied with corresponding element of the Y channel, and each element of the QpMap channel for U or V component is multiplied with corresponding element of the U or V channel. Note that the resolution of QpMap channel may be already aligned with the resolution of the corresponding component channel.

Figure 17:
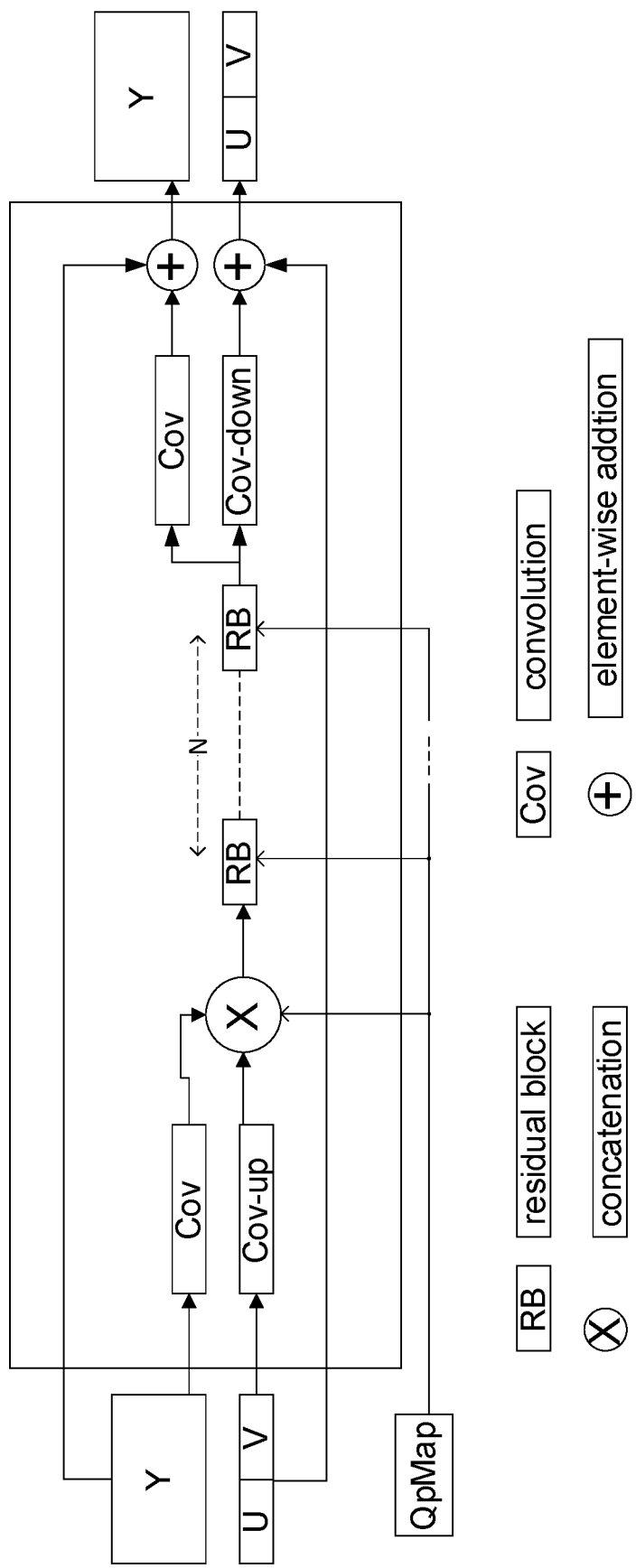
FIG. 17 illustrates an example of element-wise scaling performed at each residual block in accordance with some implementations of the present disclosure.

In another example, the element-wise scaling may also be performed at each residual block. FIG. 17 illustrates an example of element-wise scaling performed at each residual block in accordance with some implementations of the present disclosure. In FIG. 17, the QpMap channel is firstly concatenated with YUV channels after YUV resolution is aligned. Then the QpMap channels are not only used as input feature maps for the first residual block, but also used as sample value scaling factor at each residual block.

Note that, the above two sample scaling mechanisms may be exclusively used or combined. In other words, the sample scaling directly applied on YUV samples before concatenation such as FIG. 11, and the sample scaling applied at each residual block such as FIG. 17, may be both used in the same neural network or separately used in different neural networks.

In some examples of the implicit use of QpMap, the QpMap data may not be fed into the network, the scaling of sample values in each YUV channel is performed before the neural network.

Interactions Between Neural Network Based Model Filtering and Other in-Loop Filters When QpMap channels are provided to a neural network to filter video content with different qualities, the QpMap channels may include Qp information from one or more components.

Figure 12A:
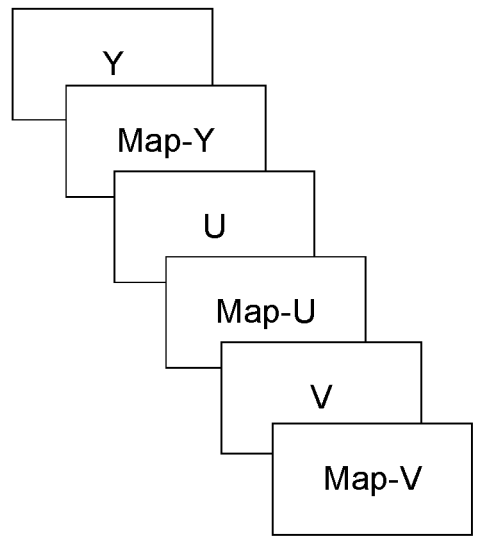
FIG. 12A illustrates an example of layout of collocated QpMap channels and YUV channels in accordance with some implementations of the present disclosure.
Figure 12B:
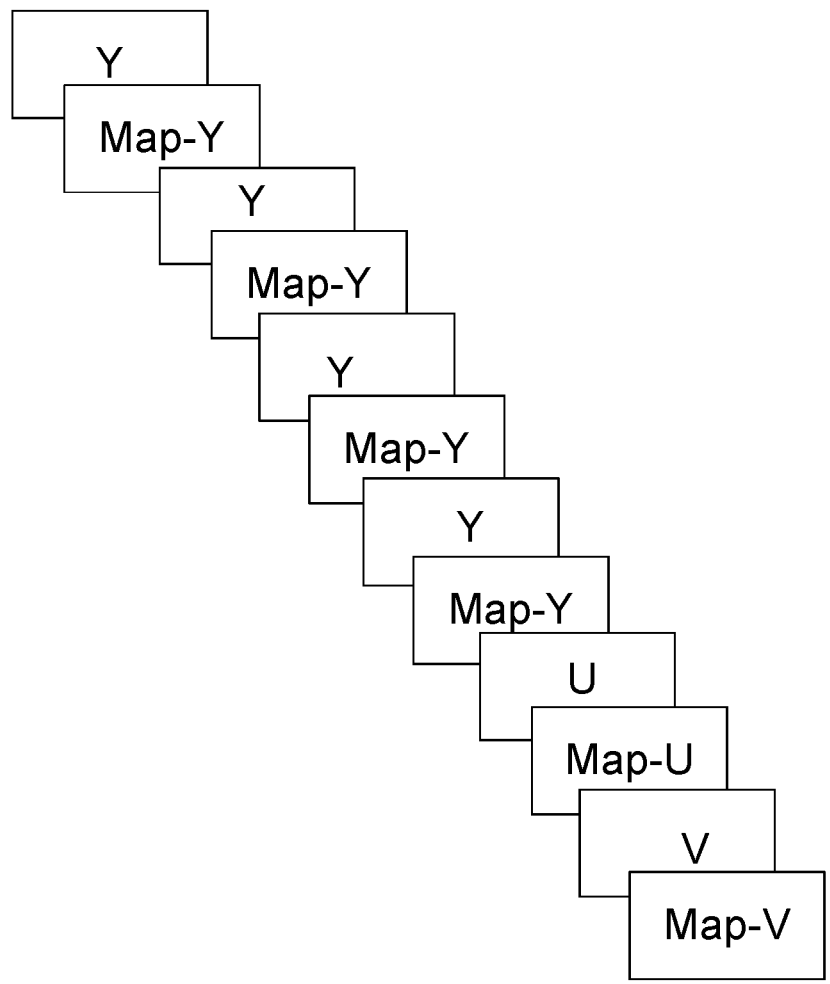
FIG. 12B illustrates an example of layout of collocated QpMap channels and YUV channels in accordance with some implementations of the present disclosure.

FIG. 12A illustrate an example of layout of collocated QpMap channels and YUV channels in accordance with some implementations of the present disclosure. FIG. 12B illustrate another example of layout of collocated QpMap channels and YUV channels in accordance with some implementations of the present disclosure. In FIGS. 12A-12B, block Map-Y indicates QpMap channel for Y channel, block Map-U indicates QpMap channel for U channel, and block Map-V indicates QpMap channel for V channel. Blocks Y, U, and V respectively indicate Y channel, U channel, and V channel.

Given a YUV420 content, the UV components may be up-sampled first and then YUV are collocated and interleaved with corresponding QpMap channels as shown in FIG. 12A, or the Y channel may be down-sampled into four smaller Y channels first and then YUV are collocated and interleaved with QpMap channels as shown in FIG. 12B. In some examples, either the up-sampling or down-sampling is performed within the network, e.g., regions 2 and 3 in FIG. 10 or outside of the network, e.g., region 1 in FIG. 10.

Figure 16A:
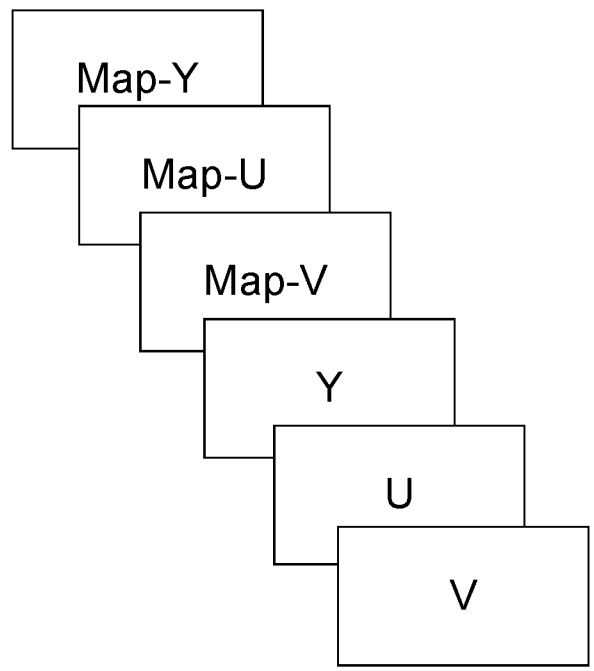
FIG. 16A illustrates another example of layout of collocated QpMap channels and YUV channels in accordance with some implementations of the present disclosure.
Figure 16B:
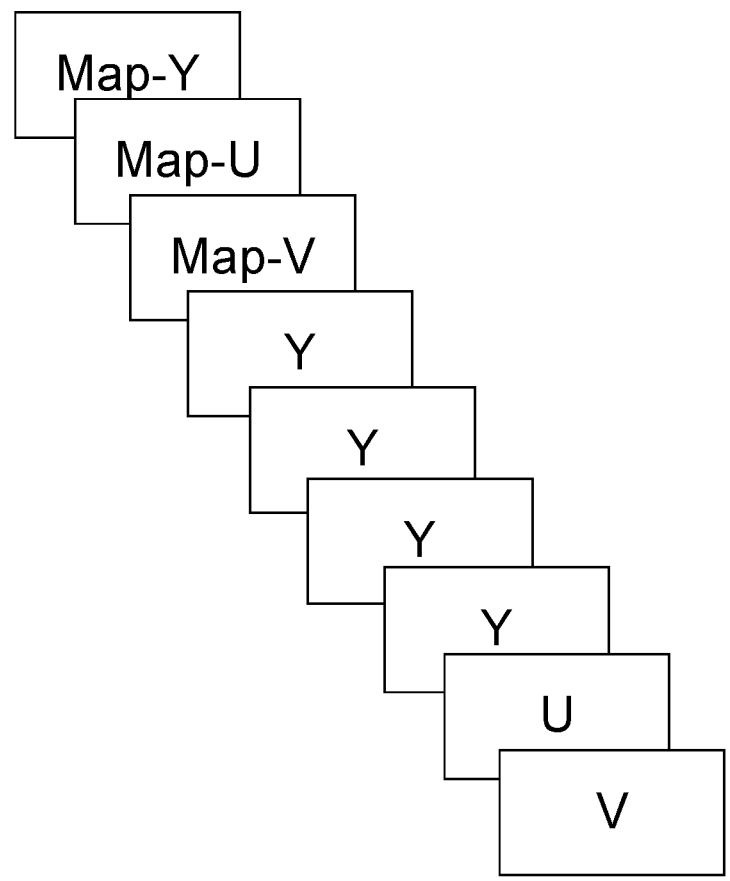
FIG. 16B illustrates another example of layout of collocated QpMap channels and YUV channels in accordance with some implementations of the present disclosure.

FIG. 16A illustrates another example of layout of collocated QpMap channels and YUV channels in accordance with some implementations of the present disclosure. FIG. 16B illustrates another example of layout of collocated QpMap channels and YUV channels in accordance with some implementations of the present disclosure. In FIGS. 16A-16B, block Map-Y indicates QpMap channel for Y channel, block Map-U indicates QpMap channel for U channel, and block Map-V indicates QpMap channel for V channel. Blocks Y, U, and V respectively indicate Y channel, U channel, and V channel. The multiple QpMap channels may be concatenated internally first then concatenated with YUV channels, as shown in FIGS. 16A-16B.

In case only one or more QpMap channels of one component is/are provided to a neural network, the one or more QpMap channels may be positioned on one side of the YUV channels, which indicates that the YUV channels are concatenated before the addition of QpMap channels so that YUV channels are adjacently collocated.

In another example, in addition of the QpMpa channels from different components, additional QpMap channels for different types of training data may be needed. For example, if the training data is cropped from I frames or B frames or P frames, a QpMap containing frame type information may be generated and concatenated. The I frames are intra-coded frames, the B frames are bi-directional predicted frames, and the P frames are predicted frames.

Filtering Offset or Scaling of the Output of the Neural Network Model Based Filter For generalization purpose, a unified neural network model based filter may be used for different video content with different level of qualities, motion and illumination environment. The output of the neural network model based filter may be slightly adjusted in the form of offset or scaling at the encoder side for better coding efficiency.

The filtering offset or scaling value may be adaptively selected by the encoder from a set of values. The offset or scaling set may be sequence based or image/slice based, which means the set may be coded in the picture/slice header or sequence parameter set. The index of the selected offset or scaling value in the set may be selected based on rate-distortion optimization algorithms at the encoder side with different granularities, e.g., picture level index selection, CTU level index selection, block level selection, e.g., a picture may be portioned into different blocks based on quad-tree division, for the purpose of good trade-off between image quality and signaling overhead.

The selection of the adaptive filtering offset or scaling value may be based on certain classification algorithms such as content smoothness or histogram of oriented gradients. The adaptive filtering offset or scaling value of each category is calculated and selected at the encoder and explicitly signaled to the decoder for reducing sample distortion effectively, while the classification of each sample is performed at both the encoder and the decoder for saving side information significantly.

The selection of the adaptive filtering offset or scaling value may be jointly or separately performed for different components, e.g., YUV have different adaptive filtering offset or scaling values.

Training Data Generation and Training Process

When a neural network based filter model is trained, the training data preparation and training process may be performed in different ways.

In some examples, the model may be trained based on a data set with only still images. The data set may be encoded with all I frames from the video coding tool where the neural network based filter is used.

In some examples, the model may be trained based on a two-path process. In the first path, a data set may be encoded with all I frames and a model A may be trained based on all the I frames. In the second path, the same data set or a new data set may be encoded with a combination of I, B and P frames with different ratios (the number ratio of the contained I, B and P frames). In some examples, the generated I/B/P frames are encoded by applying the model A trained in the first path. Based on the newly generated I/B/P frames, a new model B may be trained.

When model B is trained, model A may be loaded as a pre-trained model such that model B is a refined model staring from model A. In another example, another model different from model A may be loaded as a pre-trained point. Alternatively, model B may be trained from scratch.

In some examples, the model may be trained multi-path that is more than two-path. In the first path, a model A may be trained based on I frames. In the second path, a model B may be trained or refined based on model A based on a combination of I/B/P frames when model A is applied to the encoder. Note that the selected combination of the B/P frames during this second training path may be only from low temporary layers. In the third path or further paths, a model C may be trained or refined based on model B based on higher temporary layers of B/P frames. When higher temporary layers of B/P frames are generated and selected, model B or/and model A may be applied at the encoder side.

Before network training, training data must be generated. In this multi-path method, training data is generated by three paths including: the first pass is to generate I frames only, which is used to train model A; once model A is ready, the encoder may or may not load model A and generate low temporal layer B/P frames, which is called the second path. These generated low temporal layer B/P frames are used to train model B by a new training or being refined based on model A.

Further, once model B is ready, the encoder may or may not load model A and B and generate high temporal layer B/P frames, which is called the third path. These generated high temporal layer B/P frames are used to train model C by a new training or being refined based on model A or/and B.

Interactions Between Neural Network Based Model Filtering and Other in-Loop Filters When neural network based model filtering is signaled to be turned on at CTU level or frame level, the deblocking filtering may be skipped to avoid unnecessary computation or over-smoothing. Alternatively, the deblocking filtering may be still performed for visual quality purpose.

When neural network-based model filtering is signaled to be turned on at CTU level or frame level, some other in-loop filters such ALF, Cross Component Adaptive Loop Filter (CCALF) and SAO may be turned off.

When neural network based model filtering is signaled to be turned on at CTU level or frame level, other in-loop filters may be selectively turned on or off at CTU level or frame level. For example, if an intra-frame or an intra-frame CTU is enabled for neural network-based model filtering, other in-loop filters such as deblocking filtering, or/and ALF, or/and CCALF, or/and SAO, for current intra-frame, or current intra-frame CTU are disabled.

Figure 18:
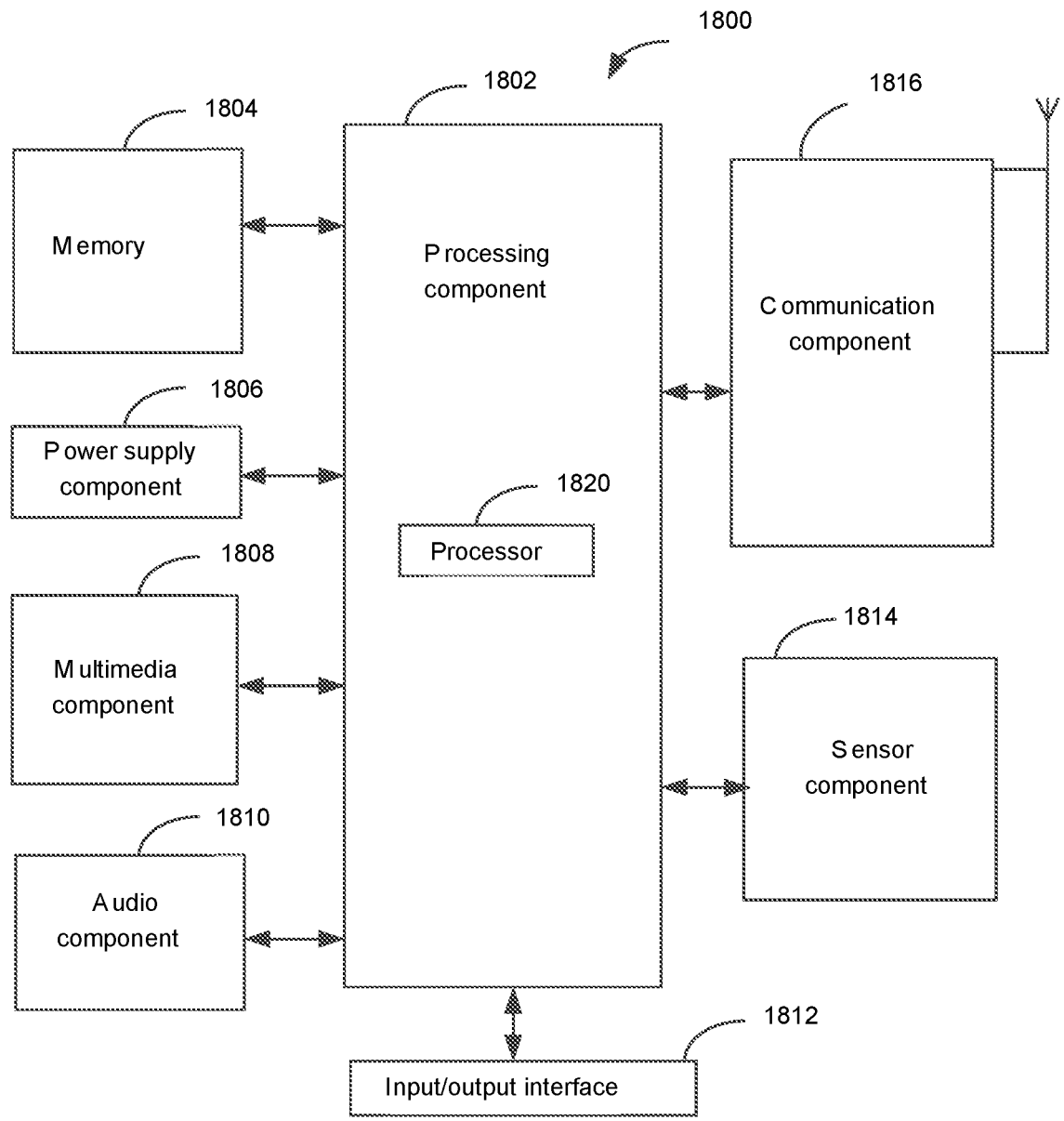
FIG. 18 is a block diagram illustrating an apparatus for image filtering in video coding using a neural network in accordance with some implementations of the present disclosure.

FIG. 18 is a block diagram illustrating an apparatus for image filtering in video coding using a neural network in accordance with some implementations of the present disclosure. The apparatus 1800 may be a terminal, such as a mobile phone, a tablet computer, a digital broadcast terminal, a tablet device, or a personal digital assistant.

As shown in FIG. 18, the apparatus 1800 may include one or more of the following components: a processing component 1802, a memory 1804, a power supply component 1706, a multimedia component 1808, an audio component 1810, an input/output (I/O) interface 1812, a sensor component 1814, and a communication component 1816.

The processing component 1802 usually controls overall operations of the apparatus 1800, such as operations relating to display, a telephone call, data communication, a camera operation, and a recording operation. The processing component 1802 may include one or more processors 1820 for executing instructions to complete all or a part of steps of the above method. Further, the processing component 1802 may include one or more modules to facilitate interaction between the processing component 1802 and other components. For example, the processing component 1802 may include a multimedia module to facilitate the interaction between the multimedia component 1808 and the processing component 1802.

The memory 1804 is configured to store different types of data to support operations of the apparatus 1800. Examples of such data include instructions, contact data, phonebook data, messages, pictures, videos, and so on for any application or method that operates on the apparatus 1800. The memory 1804 may be implemented by any type of volatile or non-volatile storage devices or a combination thereof, and the memory 1804 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1806 supplies power for different components of the apparatus 1800. The power supply component 1806 may include a power supply management system, one or more power supplies, and other components associated with generating, managing and distributing power for the apparatus 1800.

The multimedia component 1808 includes a screen providing an output interface between the apparatus 1800 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1808 may include a front camera and/or a rear camera. When the apparatus 1800 is in an operation mode, such as a shooting mode or a video mode, the front camera and/or the rear camera may receive external multimedia data.

The audio component 1810 is configured to output and/or input an audio signal. For example, the audio component 1810 includes a microphone (MIC). When the apparatus 1800 is in an operating mode, such as a call mode, a recording mode and a voice recognition mode, the microphone is configured to receive an external audio signal. The received audio signal may be further stored in the memory 1804 or sent via the communication component 1816. In some examples, the audio component 1810 further includes a speaker for outputting an audio signal.

The I/O interface 1812 provides an interface between the processing component 1802 and a peripheral interface module. The above peripheral interface module may be a keyboard, a click wheel, a button, or the like. These buttons may include but not limited to, a home button, a volume button, a start button, and a lock button.

The sensor component 1814 includes one or more sensors for providing a state assessment in different aspects for the apparatus 1800. For example, the sensor component 1814 may detect an on/off state of the apparatus 1800 and relative locations of components. For example, the components are a display and a keypad of the apparatus 1800. The sensor component 1814 may also detect a position change of the apparatus 1800 or a component of the apparatus 1800, presence or absence of a contact of a user on the apparatus 1800, an orientation or acceleration/deceleration of the apparatus 1800, and a temperature change of apparatus 1800. The sensor component 1814 may include a proximity sensor configured to detect presence of a nearby object without any physical touch. The sensor component 1814 may further include an optical sensor, such as a CMOS or CCD image sensor used in an imaging application. In some examples, the sensor component 1814 may further include an acceleration sensor, a gyroscope sensor, a magnetic sensor, a pressure sensor, or a temperature sensor.

The communication component 1816 is configured to facilitate wired or wireless communication between the apparatus 1800 and other devices. The apparatus 1800 may access a wireless network based on a communication standard, such as Wi-Fi, 4G, or a combination thereof. In an example, the communication component 1816 receives a broadcast signal or broadcast related information from an external broadcast management system via a broadcast channel. In an example, the communication component 1816 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 1800 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic elements to perform the above method. A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk, etc.

Figure 19:
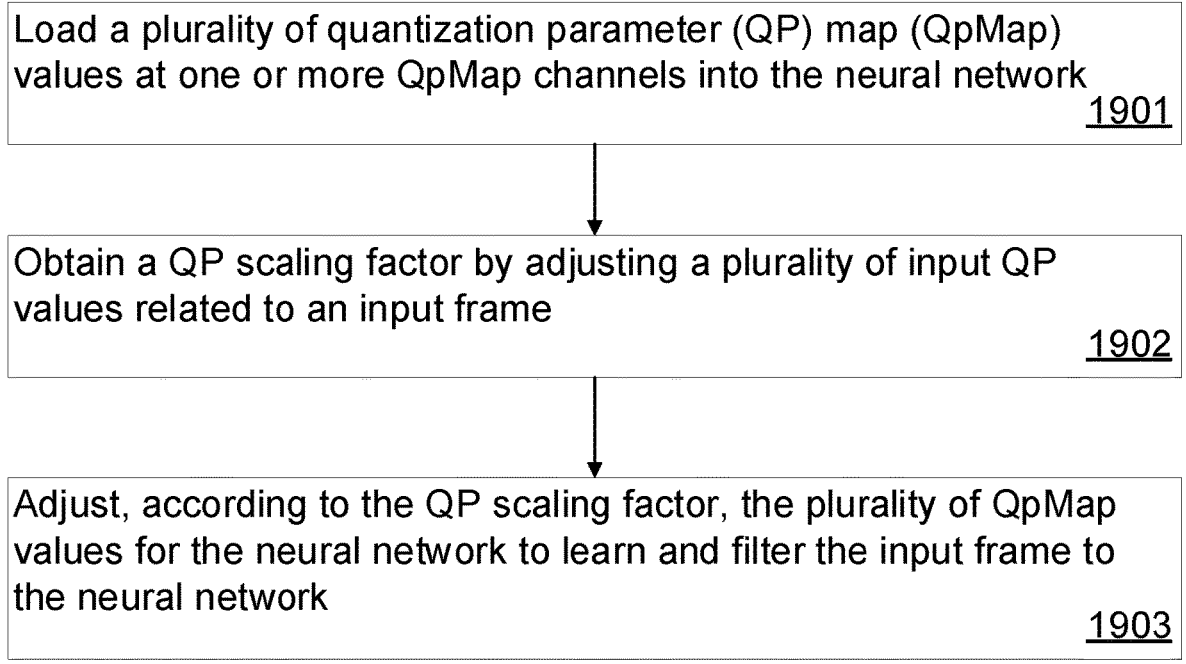
FIG. 19 is a flowchart illustrating a process for image filtering in video coding using a neural network in accordance with some implementations of the present disclosure.

FIG. 19 is a flowchart illustrating a process for image filtering in video coding using a neural network in accordance with some implementations of the present disclosure.

In step 1901, the processor 1820 loads a plurality of QpMap values at one or more QpMap channels into the neural network. As shown in FIG. 11, the plurality of QpMap channels respectively combined with corresponding YUV channels after the three convolution blocks or layers before the concatenation block.

For example, QpMap may have three channels for YUV respectively: QP-Y, QP-U, QP-V because YUV may have different QP values.

In step 1902, the processor 1820 obtains a QP scaling factor by adjusting a plurality of input QP values related to an input frame.

In step 1903, the processor 1820 adjusts, according to the QP scaling factor, the plurality of QpMap values for the neural network to learn and filter the input frame to the neural network.

In some examples, the processor 1820 may obtain a QP offset based on a QP offset step size, a lower bound, and an offset index, where the QP offset step size may be a step size for adjusting each input QP value, the lower bound may be an integer value determining a maximum QP value reduction, and the offset index may be a signaled index value. Further, the processor 1820 may subtract the QP offset from a QP input value.

In some examples, the encoder may signal the QP offset step size, the low bound, and the offset index, where the offset index may be an integer between 0 and 3, and the QP offset step size and the low bound may be respectively predefined constant values.

In some examples, the encoder may predefine the QP offset step size and the low bound. The encoder may further signal the offset index which may be an integer between 0 and 3. For examples, the QP offset step size and the low bound may be predefined as constant values. In this case, the QP offset step size and the low bound do not need to be signaled. If the QP offset step size and the low bound are not constant values, then signaling is needed.

In some examples, the processor 1820 may obtain the QP scaling factor by obtaining a QP offset and may adjust the plurality of QpMap values by subtracting the QP offset from a QP input value.

In some examples, the QP scaling factor may be obtained using a following equation $\alpha_{CH}=2^{(-QP_{offset})/6}$ as shown in equations (9) and (10), where $\alpha_{CH}$ indicates the QP scaling factor, $QP_{offset}$ indicates the QP offset.

In some examples, the QP offset may be determined per input video block.

In some examples, the QP offset may be signaled at a frame level.

In some examples, the processor 1820 may predefine a LUT, where the LUTs may include a plurality of code words and a plurality of QP offsets corresponding to the plurality of code words, as shown in Table 1 or 2.

In some examples, the processor 1820 may further signal a code word so that a decoder retrieves a QP offset corresponding to the code word based on the LUT.

In some examples, the processor 1820 may predefine a plurality of LUTs at different granularities and signal a code word so that a decoder retrieves a QP offset corresponding to the code word based on the plurality of LUTs at different granularities.

For example, a LUT may be predefined at a frame level such that all video blocks in a same frame have a same LUT and the encoder only needs to signal code words. The decoder may receive the signaled code words and retrieve corresponding QP offsets based on the received code words and the same LUT.

In some examples, the processor 1820 may predefine a plurality of LUTs at different granularities and signal a code word and a LUT step size difference so that a decoder retrieves a QP offset corresponding to the code word based on the code word and the LUT step size difference, where the LUT step size difference is a difference between a first step size and a second step size, the first step size is a difference between two adjacent QP offsets in a first LUT, and the second step size is a difference between two adjacent QP offsets in a second LUT, as shown in Table 1 and Table 2.

For examples, as shown in Tables 1-2, the first step size in Table 1 is 4 and the second step size in Table 2 is 5, and the LUT step size difference is 1 (=5−4). In some examples, the encoder does not need to send every LUT to the decoder but only the LUT step size difference such that the decoder can locate corresponding QP offset based on the LUT step size difference and previously saved LUT in the decoder.

In some other examples, there is provided a non-transitory computer readable storage medium 1804, having instructions stored therein. When the instructions are executed by one or more processors 1820, the instructions cause the processor to perform any method as described in FIG. 19 and above.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for image filtering in video coding, comprising:
   loading a plurality of quantization parameter (QP) map (QpMap) values at one or more QpMap channels into a neural network;
   obtaining a QP scaling factor by adjusting a plurality of input QP values related to an input frame; and
   adjusting, according to the QP scaling factor, the plurality of QpMap values for the neural network to learn and filter the input frame to the neural network.

2. The method of claim 1, wherein adjusting the plurality of input QP values related to the input frame comprises:
   obtaining a QP offset based on a QP offset step size, a lower bound, and an offset index, wherein the QP offset step size is a step size for adjusting each of the plurality of input QP values, the lower bound is an integer value determining a maximum QP value reduction, and the offset index is a signaled index value; and subtracting the QP offset from a QP input value.

3. The method of claim 2, further comprising:
signaling, by an encoder, the QP offset step size, the low bound, and the offset index, wherein the offset index is an integer between 0 and 3.

4. The method of claim 2, further comprising:
predefining, by an encoder, the QP offset step size and the low bound; and
signaling, by the encoder, the offset index, wherein the offset index is an integer between 0 and 3.

5. The method of claim 1, wherein obtaining the QP scaling factor comprises obtaining a QP offset; and
adjusting the plurality of QpMap values comprises subtracting the QP offset from a QP input value.

6. The method of claim 1, wherein obtaining the QP scaling factor comprises:
obtaining a QP offset; and
obtaining the QP scaling factor using a following operation:

$$\alpha_{CH}=2^{(-QP_{offset})/6}$$

wherein $\alpha_{CH}$ indicates the QP scaling factor, and $QP_{offset}$ indicates the QP offset.

7. The method of claim 6, further comprising:
determining the QP offset per input video block.

8. The method of claim 6, further comprising:
signaling, by an encoder, the QP offset at a frame level.

9. The method of claim 5, further comprising:
predefining, by an encoder, a look up table (LUT), wherein the LUT comprises a plurality of code words and a plurality of QP offsets corresponding to the plurality of code words; and
signaling, by the encoder, a code word so that a decoder retrieves the QP offset corresponding to the code word based on the LUT.

10. The method of claim 9, further comprising:
predefining, by an encoder, a plurality of look up tables (LUTs) at different granularities; and
signaling, by the encoder, the code word so that the decoder retrieves the QP offset corresponding to the code word based on the plurality of LUTs at different granularities.

11. The method of claim 9, further comprising:
predefining, by an encoder, a plurality of look up tables (LUTs) at different granularities; and
signaling, by the encoder, the code word and a LUT step size difference so that the decoder retrieves the QP offset corresponding to the code word based on the code word and the LUT step size difference, wherein the LUT step size difference is a difference between a first step size and a second step size, the first step size is a difference between two adjacent QP offsets in a first LUT, and the second step size is a difference between two adjacent QP offsets in a second LUT.

12. An apparatus for image filtering in video coding using a neural network, comprising:
one or more processors; and
a memory coupled to the one or more processors and configured to store instructions executable by the one or more processors and a bitstream,
wherein the one or more processors, upon execution of the instructions, are configured to perform operations to generate the bitstream, the operations comprising:
loading a plurality of quantization parameter (QP) map (QpMap) values at one or more QpMap channels into a neural network;
obtaining a QP scaling factor by adjusting a plurality of input QP values related to an input frame; and
adjusting, according to the QP scaling factor, the plurality of QpMap values for the neural network to learn and filter the input frame to the neural network.

13. The apparatus of claim 12, wherein adjusting the plurality of input QP values related to the input frame comprises:
obtaining a QP offset based on a QP offset step size, a lower bound, and an offset index, wherein the QP offset step size is a step size for adjusting each of the plurality of input QP values, the lower bound is an integer value determining a maximum QP value reduction, and the offset index is a signaled index value; and
subtracting the QP offset from a QP input value.

14. The apparatus of claim 13, wherein the operations further comprise:
signaling, by an encoder, the QP offset step size, the low bound, and the offset index, wherein the offset index is an integer between 0 and 3.

15. The apparatus of claim 13, wherein the operations further comprise:
predefining, by an encoder, the QP offset step size and the low bound; and
signaling, by the encoder, the offset index, wherein the offset index is an integer between 0 and 3.

16. The apparatus of claim 12, wherein obtaining the QP scaling factor comprises obtaining a QP offset; and
adjusting the plurality of QpMap values comprises subtracting the QP offset from a QP input value.

17. The apparatus of claim 12, wherein obtaining the QP scaling factor comprises:
obtaining a QP offset; and
obtaining the QP scaling factor using a following operation:

$$\alpha_{CH}=2^{(-QP_{offset})/6}$$

wherein $\alpha_{CH}$ indicates the QP scaling factor, and $QP_{offset}$ indicates the QP offset.

18. The apparatus of claim 17, wherein the operations further comprise:
determining the QP offset per input video block.

19. The apparatus of claim 17, further comprising:
signaling, by an encoder, the QP offset at a frame level.

20. A non-transitory computer-readable storage medium storing computer-executable instructions and a bitstream, wherein the computer-executable instructions, when executed by one or more computer processors, cause the one or more computer processors to store the bitstream and to perform operations to generate the bitstream, the operations comprising:
loading a plurality of quantization parameter (QP) map (QpMap) values at one or more QpMap channels into a neural network;
obtaining a QP scaling factor by adjusting a plurality of input QP values related to an input frame; and
adjusting, according to the QP scaling factor, the plurality of QpMap values for the neural network to learn and filter the input frame to the neural network.

* * * * *